(12) United States Patent
Nakahara et al.

(10) Patent No.: US 7,336,737 B2
(45) Date of Patent: Feb. 26, 2008

(54) PHASE ERROR CORRECTION CIRCUIT AND RECEIVER INCORPORATING THE SAME

(75) Inventors: Hideki Nakahara, Takaraduka (JP); Koichiro Tanaka, Takaraduka (JP); Kenichi Mori, Ibaraki (JP); Yoshio Urabe, Ikoma (JP); Hitoshi Takai, Toyono-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 774 days.

(21) Appl. No.: 10/690,560

(22) Filed: Oct. 23, 2003

(65) Prior Publication Data
US 2004/0125901 A1 Jul. 1, 2004

(30) Foreign Application Priority Data
Oct. 25, 2002 (JP) ............................. 2002-311393

(51) Int. Cl.
*H04L 27/06* (2006.01)
(52) U.S. Cl. ..................................... 375/342
(58) Field of Classification Search ............... 375/368, 375/371, 342–343, 355, 362, 260, 364; 370/509, 370/514
See application file for complete search history.

(56) References Cited

U.S. PATENT DOCUMENTS 5,550,833 A 8/1996 Fujisawa
6,104,237 A 8/2000 Mabuchi
6,278,724 B1 * 8/2001 Zhou et al. .................. 375/147
6,334,203 B1 * 12/2001 Inagawa ..................... 714/798
6,400,734 B1 6/2002 Weigand
7,023,940 B2 * 4/2006 Nakamura et al. .......... 375/354
2002/0037032 A1 3/2002 Nakamura et al.

FOREIGN PATENT DOCUMENTS

| EP | 0 913 963 | 5/1999 |
|----|-----------|--------|
| EP | 1 152 577 | 11/2001 |
| JP | 2643792 | 5/1997 |
| JP | 9-233134 | 9/1997 |

* cited by examiner

*Primary Examiner*—Khanh C. Tran
(74) *Attorney, Agent, or Firm*—Wenderoth, Lind & Ponack L.L.P.

(57) ABSTRACT

A detected signal 111 contains a preamble portion which includes symbol alternations, followed by a unique word portion, and a data portion. Each time a symbol alternation is detected, a correction value calculation section 102 averages the phase shift in the detected signal 111 for a predetermined length, thereby calculating a correction value 115. The correction value determination section 103 stores a plurality of correction values 115 in a chronological order. When the unique word portion is detected, the correction value determination section 103 retains, as an effective correction value 118, a correction value which is arrived at by going back a predetermined number of correction values among the stored correction values. A phase rotation section 104 corrects the phase of the detected signal 111 by using an effective correction value 118 calculated by the correction value determination section 103.

18 Claims, 36 Drawing Sheets

| FIG. 22A | 11 | 00 | 01 | 01 | 01 | 10 | 10 | 00 | 01 | 10 | 01 | 00 | 11 | 11 | 10 | 1- |
|---|---|---|---|---|---|---|---|---|---|---|---|---|---|---|---|---|
| FIG. 22B | 11 | 00 | ** | ** | ** | ** | ** | 00 | ** | ** | 00 | 11 | ** | ** | ** | ** |
| FIG. 22C | 11 | 00 | 01 | 10 | 01 | 11 | 10 | 10 | 00 | 10 | 00 | 10 | 11 | 10 | 00 | 1- |
| FIG. 22D | 11 | 00 | ** | ** | ** | 11 | ** | ** | 00 | 00 | ** | ** | 11 | 11 | 00 | ** |

FIG. 22A
FIG. 22B
FIG. 22C
FIG. 22D

REGION P : 0° PHASE SHIFT REGION
REGION P' : 45° PHASE SHIFT REGION

PHASE ERROR CORRECTION CIRCUIT AND RECEIVER INCORPORATING THE SAME

BACKGROUND OF THE INVENTION

1. Field of the Invention

The present invention relates to a phase error correction circuit for correcting a phase shift in a received signal, and a receiver incorporating such a phase error correction circuit, in the field of wired or wireless communications.

2. Description of the Background Art

In the field of wired or wireless communications, techniques of splitting data in frames for transmission/reception are widely used. In the case of cellular phones, for example, data is split into frames of a predetermined length, with a preamble, a unique word, or the like being added in front of each frame. A preamble is provided at the beginning of each frame. A receiver, while receiving a preamble, performs processes such as gain control, symbol clock reproduction, or phase shift detection, in order to control the manner in which subsequent portions to a preamble (e.g., a unique word and/or data) are received.

A phase shift may occur between a signal transmitted from a transmitter and the signal received by a receiver, due to a frequency offset between local oscillators used in both devices, phase noise, or the like. Therefore, a receiver is equipped with a phase error correction circuit for correcting a phase shift in the received signal. The receiver regards the phase shift which has been detected while receiving a preamble as a phase correction value for portions subsequent to the preamble, and performs a phase correction for the portions subsequent to the preamble by using this value. When calculating a correction value using this method, however, a demodulation error may be induced if the correction value is calculated not only with respect to the phase shift in the preamble but also portions other than the preamble. Therefore, the calculation of the correction value must be based only on the phase shift in the preamble.

FIG. 40 is a block diagram illustrating the structure of a conventional demodulator described in Japanese Patent No. 2643792. The demodulator shown in FIG. 40 detects a preamble which is contained in the received signal, and infers a carrier frequency error based on the preamble detection signal. An input signal 4020 to this demodulator is a π/4 shift DQPSK (Differential Quadrature Phase Shift Keying) modulated signal containing a preamble of a certain pattern.

In FIG. 40, a delay detection means 4001 detects an input signal 4020 which is a π/4 shift DQPSK modulated signal. An averaging circuit 4002 subjects the detected signal to an averaging with respect to each of its two orthogonal signal components, and outputs a phase vector 4021. A preamble detection means 4003 includes a power detection circuit 4004, which calculates the magnitude of the phase vector 4021, and a comparison circuit 4005, which compares the calculated magnitude against a predetermined threshold level. The comparison circuit 4005 outputs a preamble detection signal 4022 if the magnitude of the phase vector 4021 exceeds a predetermined threshold level. A phase angle calculation means 4006 includes a flip-flop 4007, which fetches and retains the phase vector 4021 at the time when the preamble detection signal 4022 is output, and an arc tangent conversion ROM 4008, which outputs the phase angle of the retained phase vector. An adder 4009 adds π/2 to the calculated phase angle. Based on an output signal from the adder 4009, a frequency error calculation means 4010 calculates a carrier frequency error. An oscillation frequency of a variable frequency oscillation means 4011 is controlled based on the carrier frequency error calculated by the frequency error calculation means 4010. Using the oscillation signal output from the variable frequency oscillation means 4011, a frequency converter 4012 subjects the input signal 4020 to a frequency conversion. As a result, the frequency error of the input signal 4020 is corrected. A recovery circuit 4013 recovers the carrier and a clock from the input signal which has been subjected to frequency error correction, and outputs a demodulated signal 4023 through synchronization detection.

Thus, in order to obtain a carrier frequency error while receiving a preamble, the above-described conventional phase error correction circuit detects a preamble by comparing the magnitude of the phase vector 4021 against a predetermined threshold level, and then calculates a frequency error correction value based on the preamble detection signal 4022.

When a frame-formatted signal is sent through burst transmission, the receiver, which wants to detect the transmitted preamble, performs such a gain control that the gain for the received signal is initially made maximum. As a result, the amplitude of the detected signal is saturated in a earlier portion of the preamble. Thereafter, the amplitude of the detected signal is reduced over time through the gain control, until the gain control becomes stabilized in a later portion of the preamble. Therefore, the calculation of a correction value while receiving a preamble should really be made by calculating the correction value at the later portion of the preamble, where gain control has been stabilized.

However, in accordance with the above conventional phase error correction circuit, the magnitude of the phase vector varies depending on the state of reception. This makes it difficult to identify a later portion of the preamble based on a comparison of the magnitude of the phase vector against a predetermined threshold level. The conventional phase error correction circuit also has problems associated with temporal variations in amplitude due to fading, and gain control stability.

SUMMARY OF THE INVENTION

Therefore, an object of the present invention is to provide a phase error correction circuit which can accurately correct a phase shift, even in the presence of signal intensity variations due to fading or the like, by calculating a phase correction value at a later portion of the preamble, and a receiver incorporating the same.

The present invention has the following features to attain the object mentioned above.

A first aspect of the present invention is directed to a phase error correction circuit for correcting a phase error in an input signal having a frame structure containing a preamble, a specific pattern, and data. The phase error correction circuit comprises: a correction value calculation section for calculating a phase correction value based on a predetermined number of symbols contained in the input signal; a correction value determination section for retaining with a predetermined timing a phase correction value calculated by the phase correction value calculation section, based on the predetermined number of symbols contained in the preamble; a phase rotation section for subjecting the input signal to a phase rotation process using the phase correction value retained in the correction value determination section; and a specific pattern detection section for detecting the specific pattern contained in an output signal from the phase rotation section to output a specific pattern detection signal. The correction value determination section retains the phase correction value calculated by the correction value calculation section with a timing determined based on the specific pattern detection signal. In this case, the correction value determination section may output the phase correction value calculated by the correction value calculation section to the phase rotation section until retaining the phase correction value calculated by the correction value calculation section with the predetermined timing, and until the correction value determination section retains the phase correction value calculated by the correction value calculation section with the predetermined timing, the phase rotation section may subject the input signal to a phase rotation process using the phase correction value which is output from the correction value determination section.

The phase error correction circuit may further comprise an alternation detection section for outputting an alternation detection signal indicating inversions of a sign of the input signal from symbol to symbol. More preferably, the correction value calculation section may calculate the phase correction value with respect to a portion of the input signal for which the alternation detection signal is output.

The correction value calculation section may include: a phase inversion section for inverting a phase of the input signal from symbol to symbol; a mean value calculation section for calculating a mean value of the predetermined number of symbols in an output signal from the phase inversion section; and a mean value inversion section for inverting, depending on a sign of an output signal from the mean value calculation section, the sign of the output signal (first construction). More preferably, the mean value calculation section may calculate the mean value by cumulatively adding the output signal from the phase inversion section by using one symbol adder, such that one mean value is calculated per plurality of symbol periods (second construction). The mean value calculation section may calculate the mean value by cumulatively adding the output signal from the phase inversion section by using a plurality of symbol adders in parallel, such that one mean value is calculated per symbol period (third construction). The phase error correction circuit may further comprise a delay section for delaying the input signal supplied to the correction value calculation section by a predetermined amount of time from the input signal supplied to the phase rotation section, wherein the predetermined amount of time is determined so that the specific pattern is detected by the specific pattern detection section while the correction value calculation section is calculating the phase correction value with respect to the preamble contained in the input signal (fourth construction).

The correction value determination section may retain the phase correction value calculated by the correction value calculation section based on the predetermined number of symbols including the last symbol of the preamble. Alternatively, The correction value determination section may include: a correction value storage section for storing a plurality of phase correction values calculated by the correction value calculation section in a chronological order; a correction value selection section for selecting one of the phase correction values stored in the correction value storage section; and a correction value retention section for, based on the specific pattern detection signal, fetching and retaining the phase correction value selected by the correction value selection section, and stopping fetching the phase correction value after the specific pattern detection signal is output. More preferably, the correction value selection section may receive an indication of a number of correction values to go back, and from among the phase correction values stored in the correction value storage section, selects and outputs a phase correction value as designated by the number of correction values to go back. Alternatively, the correction value may further comprise an end detection section for detecting an end portion of the data contained in the input signal to output an end detection signal, and the correction value retention section may start fetching the phase correction value after a predetermined amount of time since the end detection signal is output.

The phase error correction circuit may further comprise a 45° rotation section for rotating a phase of the input signal supplied to the correction value calculation section by 45°

A second aspect of the present invention is directed to a receiver for receiving a digitally-modulated signal, comprising: a detector section for detecting a received signal; a clock recovery section for recovering a clock signal from an output signal from the detector section while switching zero cross reference axes based on a given control signal; and a phase error correction circuit for correcting a phase error in an output signal from the detector section for which judging points have been determined based on the clock signal recovered by the clock recovery section, and supplying phase error information indicating a magnitude of the phase error as the control signal to the clock recovery section.

A third aspect of the present invention is directed to a receiver for receiving a digitally-modulated signal, comprising: a detector section for detecting a received signal; a phase error correction circuit for correcting a phase error in an output signal from the detector section using a given clock signal; and a clock recovery section for, based on a signal which has been corrected by the phase error correction circuit, recovering a clock signal to be used for demodulating the signal, and supplying the recovered clock signal to the phase error correction circuit. In the second and third aspects, the received signal may be a signal having a frame structure containing a preamble, a specific pattern, and data, and the phase error correction circuit may be the phase error correction circuit according to the first aspect of the invention.

A fourth aspect of the present invention is directed to a signal transmission method for transmitting data in frames, comprising the steps of: splitting data to be transmitted into units of a predetermined length; generating a frame-structured data by adding, in front of each unit of split data, a preamble which alternates from symbol to symbol, and a specific pattern selected so as not to allow a predetermined length of symbol-to-symbol alternations to occur even in the presence of a symbol error; and subjecting the frame-structured data to digital modulation and transmitting the modulated frame-structured data.

According to the first aspect of the invention, when a specific pattern is detected, a phase correction value which is calculated from a preamble is retained, and the input signal is subjected to a phase correction using the retained phase correction value. By using such a phase correction value calculated from the preamble, a highly accurate phase correction can be performed. By suitably constructing the correction value determination section, it becomes possible to subject the input signal to a phase correction using a phase correction value which is calculated from a later part of the preamble, at which the characteristics of the input signal have already been stabilized, whereby an even more accurate phase correction can be realized.

By employing the aforementioned alternation detection section, a portion of the input signal which includes symbol-to-symbol alternations is regarded as the preamble. This allows the preamble to be detected by means of simple circuitry, prevents misdetection of the preamble, and also prevents the input signal from being subjected to a phase correction using a phase correction value which is calculated from any portion other than the preamble. By employing a correction value calculation section which calculates a phase correction value with respect to a portion for which the alternation detection signal is output, the portion of the input signal which includes symbol-to-symbol alternations can be regarded as the preamble, so that the phase correction value can be properly derived from the preamble.

By employing a correction value calculation section having the first structure, a mean value for a predetermined number of symbols is calculated as a correction value; thus, the influence of noise contained in each symbol and the like can be reduced, whereby the accuracy of the correction value can be improved. By employing a correction value calculation section having the second construction, a mean value of the output signal from the phase inversion section can be calculated by means of simple circuitry. By employing a correction value calculation section having the third construction, a mean value of the output signal from the phase inversion section can be accurately calculated for each symbol, by using a plurality of symbol adders. In particular, since an accurate correction value can be calculated with respect to the end of the preamble (i.e., immediately before the specific pattern is to be detected), a highly accurate phase correction can be performed for the input signal by using such a phase correction value. By employing a correction value calculation section having the fourth construction, when the specific pattern is detected, a phase correction value which is calculated from the preamble is retained without fail; thus, a highly accurate phase correction can be performed for the input signal by using the retained phase correction value. By suitably constructing the correction value determination section, it becomes possible to subject the input signal to a phase correction using a phase correction value which is calculated from a later part or the end of the preamble, at which the characteristics of the input signal have already been stabilized, whereby an even more accurate phase correction can be realized.

By employing a correction value determination section which retains a phase error that is calculated with respect to symbols including the last symbol of the preamble, it is ensured that the correction value is calculated using the portion of the signal that has the best characteristics. By employing a correction value determination section including a correction value storage section, a correction value selection section, and a correction value retention section, correction values which are calculated from the preamble are sequentially stored, and when the specific pattern is detected, a correction value which is arrived at by going back in time is retained. As a result, the input signal is subjected to a phase correction using the retained phase correction value, whereby a highly accurate phase correction can be performed on the basis of the correction value which is calculated from the preamble. Since the correction value is not updated after the specific pattern is detected, unwanted correction values which are calculated from the specific pattern or the data are prevented from being used. By employing a correction value selection section which selects a phase correction value based on a number of correction values to go back, such that the number of correction values to go back is selected by considering the data pattern of the specific pattern and the like, the circuitry scale of the correction value storage section can be reduced. By employing the aforementioned end detection section, and employing a correction value retention section which starts fetching the phase correction value after an end detection signal is output, the phase correction value is not updated for a certain amount of time after the end of the data is detected; thus, unwanted correction values which are calculated near the end of the frame are prevented from being used.

By employing the aforementioned 45° rotation section, a highly accurate phase correction can be performed even for an input signal which has been modulated by $\pi/4$ DQPSK technique or the like.

According to the second aspect of the invention, a stable symbol timing can be obtained even in the case where the input signal has a large phase shift. As a result, the demodulation characteristics can be improved.

According to the third aspect of the invention, zero crosses are detected for a detection output whose phase shift has already been corrected. As a result, the demodulation characteristics can be improved even in the case where the input signal has a large phase shift, without having to switch zero cross reference axes at the time of clock recovery.

According to the fourth aspect of the invention, data is transmitted with a specific pattern added thereto, such that the specific pattern will not be mistaken for the preamble. Thus, when the specific pattern is detected, the receiver can retain a phase correction value calculated from the preamble, and perform a phase correction for the received signal by using the retained phase correction value, whereby a highly accurate phase correction can be realized.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 22A, 22B, 22C, and 22D are diagrams each illustrating a data pattern of a UW portion used by the phase error correction circuit shown in FIG. 1;

DESCRIPTION OF THE PREFERRED EMBODIMENTS

First Embodiment

Figure 1:
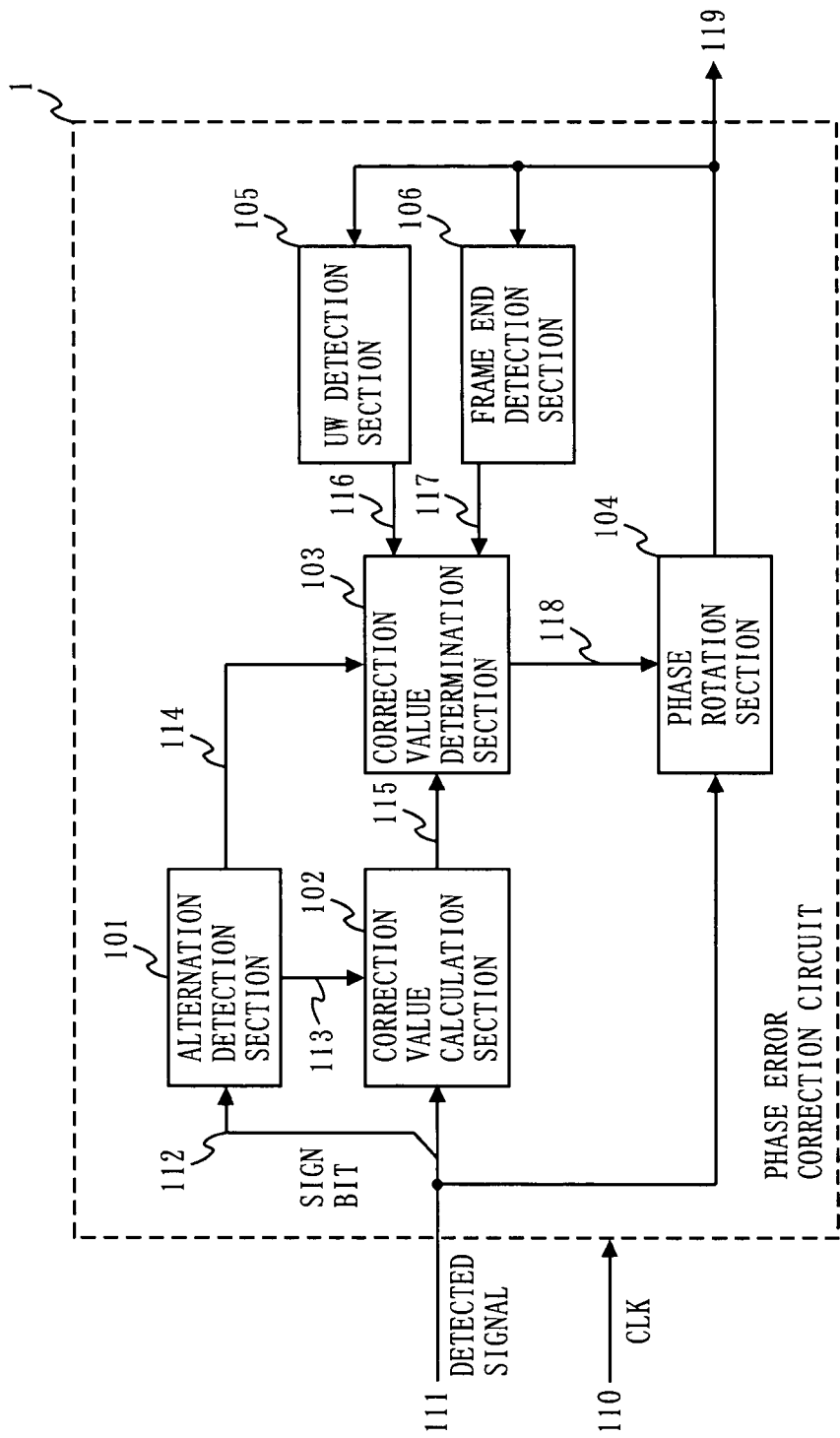
FIG. 1 is a block diagram illustrating the structure of a phase error correction circuit according to a first embodiment of the present invention.

FIG. 1 is a block diagram illustrating the structure of a phase error correction circuit 1 according to a first embodiment of the present invention. The phase error correction circuit 1 shown in FIG. 1 comprises an alternation detection section 101, a correction value calculation section 102, a correction value determination section 103, a phase rotation section 104, a unique word detection section 105 (hereinafter referred to as a "UW detection section"), and a frame end detection section 106. A signal which is obtained by subjecting frame-structured data to a digital modulation is input to the phase error correction circuit 1. The phase error correction circuit 1 corrects a phase shift in the input signal occurring due to a frequency offset between local oscillators used in a transmitter and a receiver, for example.

Figure 2:
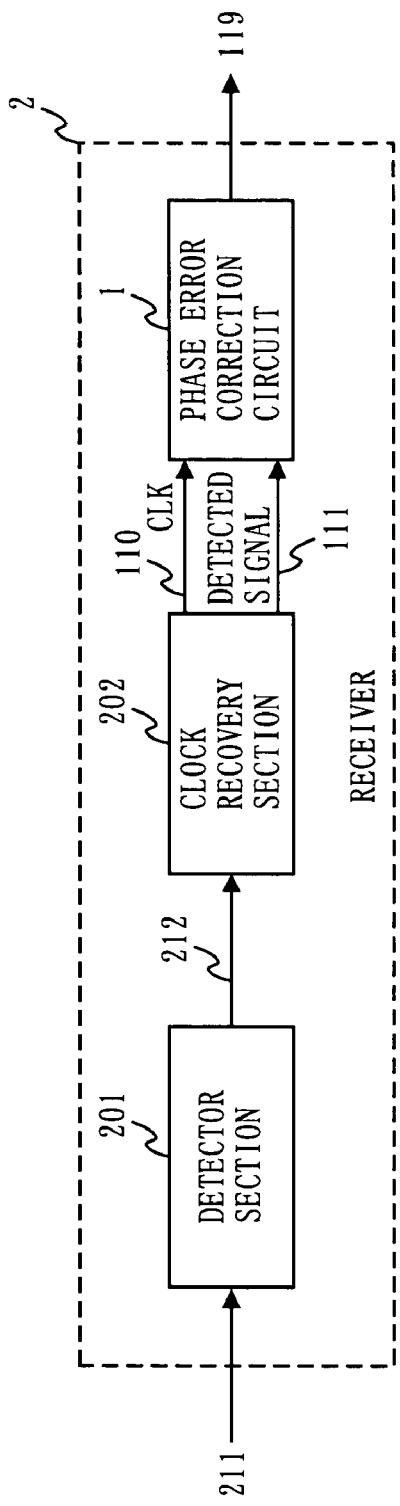
FIG. 2 is a block diagram illustrating the structure of a receiver incorporating the phase error correction circuit shown in FIG. 1.

FIG. 2 is a block diagram illustrating the structure of a receiver 2 incorporating the phase error correction circuit 1. As shown in FIG. 2, a detector section 201 and a clock recovery section 202 are provided in front of the phase error correction circuit 1, thus composing the receiver 2. The receiver 2 receives a digitally-modulated signal from a transmitter (not shown). The detector section 201 subjects the received signal 211 to a detection, thereby outputting a detection output 212. Based on the detection output 212, the clock recovery section 202 outputs a sampled signal which has been sampled on the basis of judging points which are optimally selected for data judgement, and a clock signal which defines the timing of the judging points. Hereinafter, the aforementioned sampled signal will be referred to as a detected signal 111, whereas the aforementioned clock signal will be referred to as a symbol clock 110. The phase error correction circuit 1 receives the detected signal 111 and the symbol clock 110. In the description below, it is assumed for example that the detected signal 111 is a signal which is obtained by subjecting a QPSK (Quadrature Phase Shift Keying) modulated signal to delay detection.

Figure 3:
FIG. 3 shows a frame format of a detected signal which is input to the phase error correction circuit shown in FIG. 1.

FIG. 3 shows a frame format of the detected signal 111 which is input to the phase error correction circuit 1. The phase error correction circuit 1 receives the detected signal 111 in the frame structure shown in FIG. 3. Beginning from the top, the frame contains a preamble portion, a unique word portion, and a data portion, with the data portion being placed at the end of the frame. Hereinafter, the preamble portion and the unique word portion may be abbreviated as a "PR portion" and a "UW portion", respectively.

Figure 4:
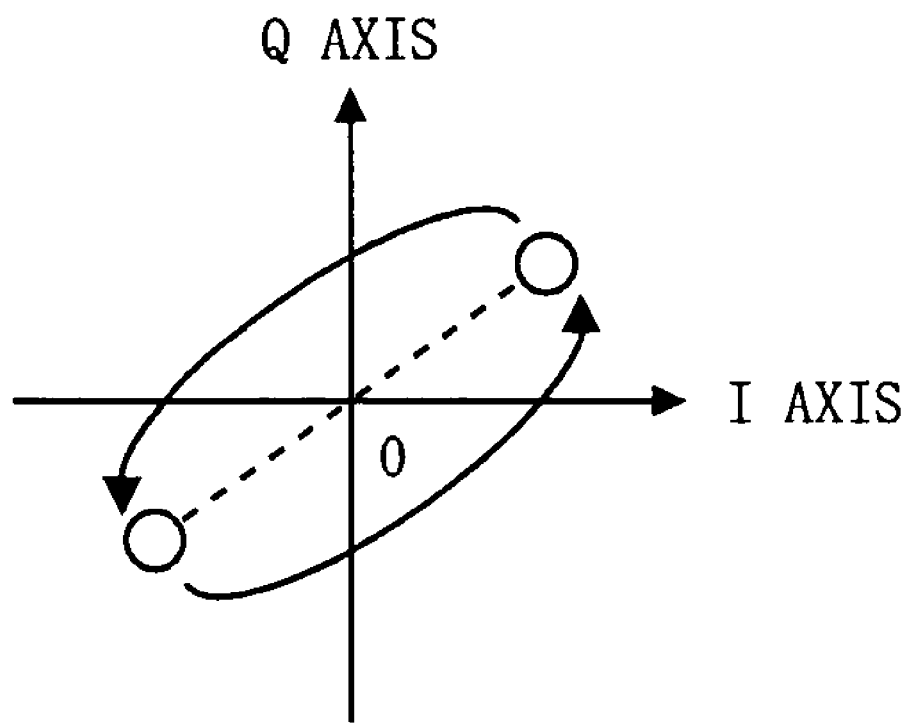
FIG. 4 is a chart illustrating a constellation pattern of a PR portion of a detected signal which is input to the phase error correction circuit shown in FIG. 1.

In the PR portion is set a data pattern such that phase angles of two adjacent symbols are reversed by 180°. Hereinafter, a signal containing such 180° reversals of symbol phase angles will be said to contain "alternating symbols", and patterns consisting of such alternating symbols will be referred to as "symbol alternations". FIG. 4 is a chart illustrating a constellation pattern of the PR portion of the detected signal 111. As shown in FIG. 4, a data pattern containing a predetermined number of alternating symbols, i.e., symbol alternations spanning a predetermined length, is set in the PR portion. A data pattern for establishing frame synchronization is set in the UW portion. The data pattern which is set in the UW portion is also used for identifying a receiver on the other end of the communication. Each receiver 2 has unique identification information set thereto, such that the receiver 2 will perform a receiving process only with respect to frames whose UW portion contains identification information that corresponds to that receiver 2. In the data portion, split data having a predetermined length is set.

Before describing the detailed structure of the phase error correction circuit 1, the main features of the phase error correction circuit 1 will be described. The receiver 2 incorporating the phase error correction circuit 1 receives the received signal 211 in a frame by frame manner. In order to control the manner of receiving portions other than the PR portion (i.e., the UW portion and the data portion) while receiving the PR portion, the circuitry which is placed before the phase error correction circuit 1 performs processes such as gain control and symbol clock reproduction. The phase error correction circuit 1 detects a phase shift concerning the PR portion, and utilizes the detected phase shift as a phase correction value for portions other than the PR portion. Since the accuracy of gain control and symbol clock reproduction gradually improves while the PR portion is being received, the characteristics of the detected signal 111 are relatively poor in the earlier part of the PR portion, and gradually improve toward the later part of the PR portion. Therefore, as a phase correction value, the phase error correction circuit 1 utilizes a phase shift which is detected as late in the PR portion as possible, in a manner described below.

While receiving the PR portion, the phase error correction circuit 1 repeatedly performs calculations of a mean value of the phase shift in the detected signal 111, and, by regarding the calculated mean values as phase correction values, stores them in a chronological order. Thereafter, when the UW portion is detected, the phase error correction circuit 1 selects and retains one of the plurality of correction values thus stored, and performs a phase correction for portions other than the PR portion by using the one retained correction value. Specifically, the correction value to be retained is selected by going back a predetermined number of correction values from the most recently calculated correction value in all the correction values that have been stored up to the time when the UW portion is detected.

Moreover, rather than detecting the exact PR portion, the phase error correction circuit 1 detects symbol alternations spanning a predetermined length that are contained in the detected signal 111, and relies on the detection of such symbol alternations to determine that a PR portion has been detected. Furthermore, if any calculated correction value falls outside a predetermined range, the phase error correction circuit 1 does not use such a correction value for phase correction. In addition, the phase error correction circuit 1 is provided with a mechanism for preventing misdetections of the PR portion and the UW portion. These features of the phase error correction circuit 1 will become apparent through understanding the following descriptions.

The phase error correction circuit 1 shown in FIG. 1 generally operates in the following manner. Based on whether a sign bit 112 of the detected signal 111 is inverted between adjacent symbols or not, the alternation detection section 101 detects symbol alternations. The alternation detection section 101 outputs an alternation detection signal 113 which indicates the detection of symbol alternations, and a correction value calculation signal 114 which indicates the detection of a predetermined number of consecutive symbol alternations. While the alternation detection signal 113 is being output, the correction value calculation section 102 repeatedly derives a mean value of the phase shift in the detected signal 111 by a predetermined method, and outputs each derived mean value as a correction value 115. The correction value determination section 103 stores the correction values 115 in a chronological order, and outputs a selected one of the stored correction values as an effective correction value 118. The phase rotation section 104 performs a phase rotation process for the detected signal 111 by using the effective correction value 118, and outputs a corrected detected signal 119. The UW detection section 105 outputs a unique word detection signal 116 (hereinafter referred to as a "UW detection signal") upon detecting the UW portion contained in the corrected detected signal 119. The frame end detection section 106 outputs a frame end detection signal 117 upon detecting an end portion of the frame from the corrected detected signal 119. The correction value calculation signal 114, the UW detection signal 116, and the frame end detection signal 117 are used to determine the timing at which the correction value determination section 103 fetches and retains the effective correction value 118.

Hereinafter, the details of the phase rotation section 104, the alternation detection section 101, the correction value calculation section 102, and the correction value determination section 103 will be described. The phase rotation section 104 performs a phase rotation process for the detected signal 111 by using the effective correction value 118, and outputs the corrected detected signal 119. More specifically, the detected signal 111 and the effective correction value 118 are input to the phase rotation section 104 in the form of a two-dimensional vector. The phase rotation section 104 performs calculations in accordance with eq. 1 and eq. 2 below:

$$OUTI = INI \times CPI + INQ \times CPQ \qquad \text{eq. 1}$$

$$OUTQ = INQ \times CPI - INI \times CPQ \qquad \text{eq. 2}$$

In eq. 1 and eq. 2, INI and INQ respectively represent an in-phase component and a quadrature-phase component of the detected signal 111 (hereinafter referred to as the "I axis component" and the "Q axis component", respectively); CPI and CPQ respectively represent the I axis component and the Q axis component of the effective correction value 118; OUTI and OUTQ respectively represent the I axis component and the Q axis component of the corrected detected signal 119.

By performing such a phase rotation process by means of the phase rotation section 104, it becomes possible to correct the phase shift which occurs in the detected signal 111 due to a frequency offset, etc., between the transmitter and the receiver. Since the phase shift in the detected signal 111 can be corrected through addition/subtraction/multiplication calculations as expressed by eq. 1 and eq. 2, the phase shift in the detected signal 111 can be corrected by means of a simple structure, without having to derive a phase angle or rely on amplitude information.

Figure 5:
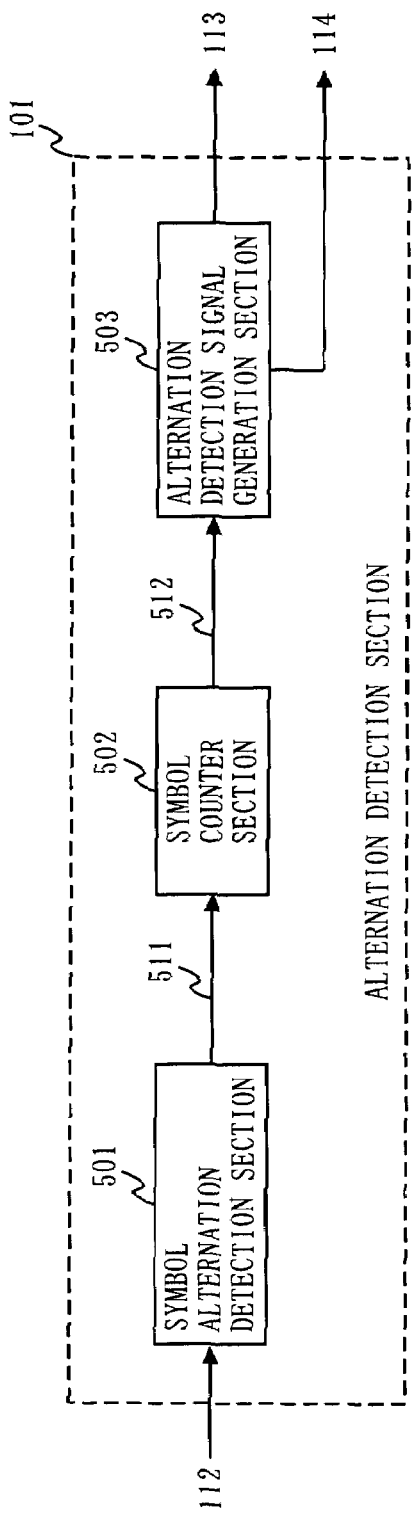
FIG. 5 is a block diagram illustrating the detailed structure of an alternation detection section included in the phase error correction circuit shown in FIG. 1.

FIG. 5 is a block diagram illustrating the detailed structure of the alternation detection section 101. The alternation detection section 101 includes a symbol alternation detection section 501, a symbol counter section 502, and an alternation detection signal generation section 503. The sign bit 112 of the detected signal 111 is input to the symbol alternation detection section 501. When detecting that the sign bit 112 is undergoing phase inversions between adjacent symbols (that is, symbol alternations), the symbol alternation detection section 501 outputs a symbol alternation detection signal 511.

Based on the symbol alternation detection signal 511, the symbol counter section 502 counts the number of symbol alternations which have consecutively occurred, and outputs a count value 512. More specifically, the symbol counter section 502 includes a counter whose initial value is set to a predetermined value N (where N is an integer equal to or greater than 1), and increments the count value 512 by one from 0 to (N−1) each time the symbol alternation detection signal 511 is input. If the symbol alternation detection signal 511 is not input, the symbol counter section 502 initializes the count value 512 to the predetermined value N. The alternation detection signal generation section 503 outputs the alternation detection signal 113 while the count value 512 is in the range from 0 to (N−1), and once the count value 512 reaches (N−1), outputs the correction value calculation signal 114 to indicate that consecutive symbol alternations have occurred for N symbols.

Figure 6:
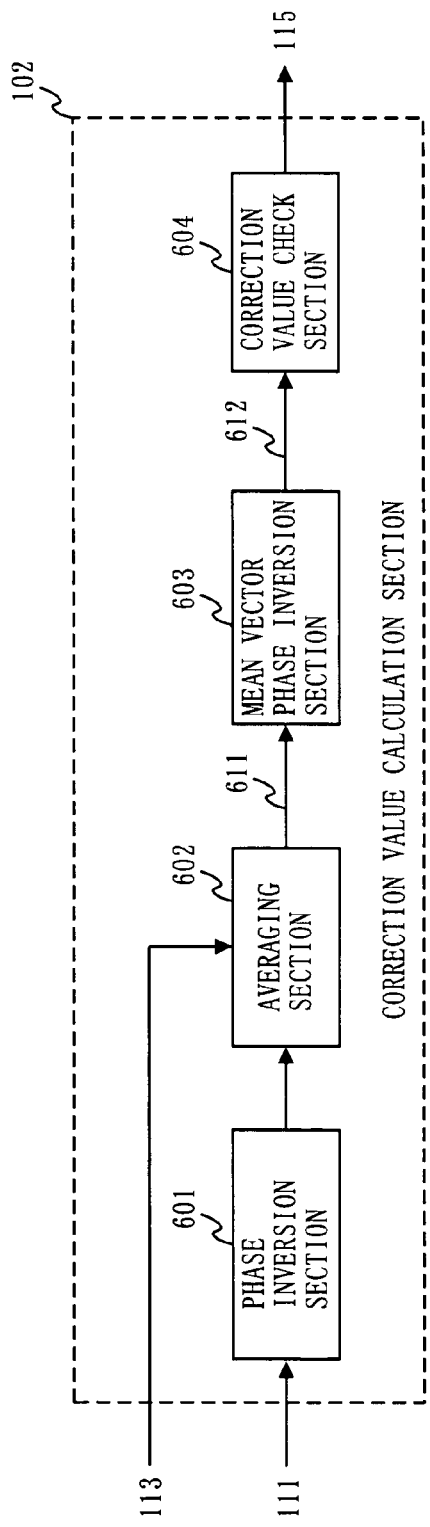
FIG. 6 is a block diagram illustrating the detailed structure of a correction value calculation section included in the phase error correction circuit shown in FIG. 1.

FIG. 6 is a block diagram illustrating the detailed structure of the correction value calculation section 102. The correction value calculation section 102 includes a phase inversion section 601, an averaging section 602, a mean vector phase inversion section 603, and a correction value check section 604. The phase inversion section 601 inverts the phase of the detected signal 111 by 180° for every other symbol. In other words, for the detected signal 111, the phase inversion section 601 alternately performs a process of inverting the symbol phase by 180° and a process of outputting the symbol without inversion, in a symbol by symbol manner.

Figure 7:
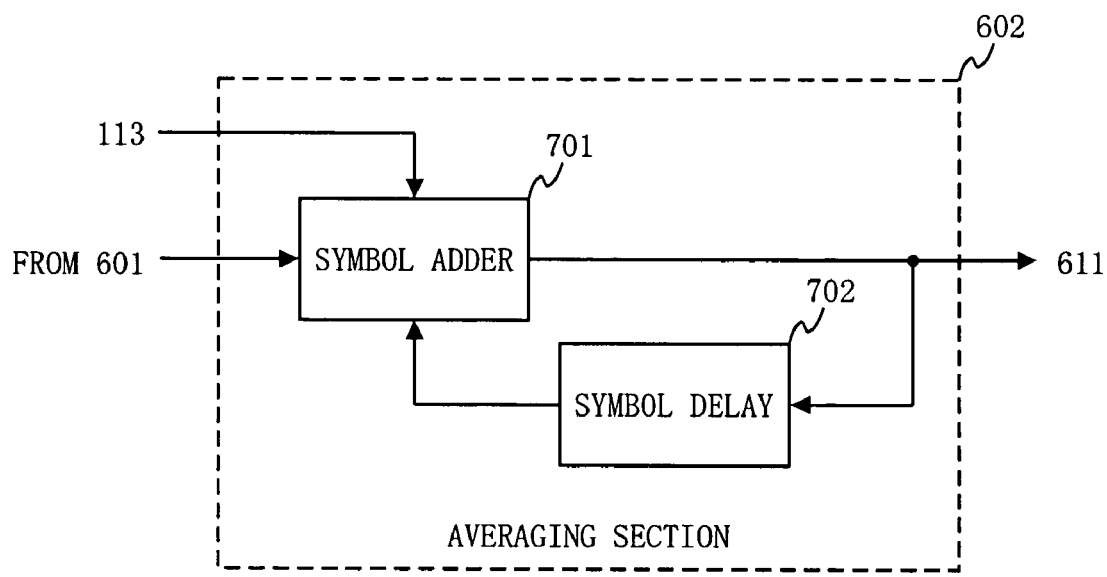
FIG. 7 is a block diagram illustrating the detailed structure of an averaging section included in the phase error correction circuit shown in FIG. 1.

FIG. 7 is a block diagram illustrating the detailed structure of the averaging section 602, which includes a symbol adder 701 and a symbol delay 702. While the input alternation detection signal 113 is valid, the averaging section 602 averages the I axis component and the Q axis component of the output signal from the phase inversion section 601 for a predetermined number M (where M is an integer which is equal to or greater than two and equal to or less than the number of symbols contained in the preamble), the averaging being separately performed for the I axis component and the Q axis component, thereby deriving a first mean vector 611. When the alternation detection signal 113 becomes invalid, the averaging section 602 resets the value retained in the symbol delay 702 to zero. More specifically, the symbol delay 702 delays the I axis component and the Q axis component of the output signal from the symbol adder 701, each by one symbol period. If the input alternation detection signal 113 is valid, the symbol adder 701 adds the I axis component and the Q axis component of the output signal from the symbol delay 702 to the I axis component and the Q axis component, respectively, of the output signal from the phase inversion section 601. By using this averaging section 602, a mean value of each of the I axis component and the Q axis component of the output signal from the phase inversion section 601 can be calculated, such that one mean value (of each of the I axis component and the Q axis component) is obtained per plurality of symbol periods. In the case where the noise contained in the signal is so low that the signal degradation due to noise is negligible, the aforementioned averaging process by the averaging section 602 can be omitted by setting the predetermined number M to one.

The mean vector phase inversion section 603 determines whether it is necessary to perform a phase inversion based on the sign of the I axis component (or the Q axis component) of the first mean vector 611, and inverts the phase of the first mean vector 611 by 180° based on the result of the determination. In the present embodiment, it is assumed that the mean vector phase inversion section 603 inverts the phase of the first mean vector 611 by 180° when the I axis component of the first mean vector 611 is negative. Thus, the mean vector phase inversion section 603 outputs a signal obtained by inverting or not inverting the phase of the first mean vector 611 as a second mean vector 612.

Figure 8:
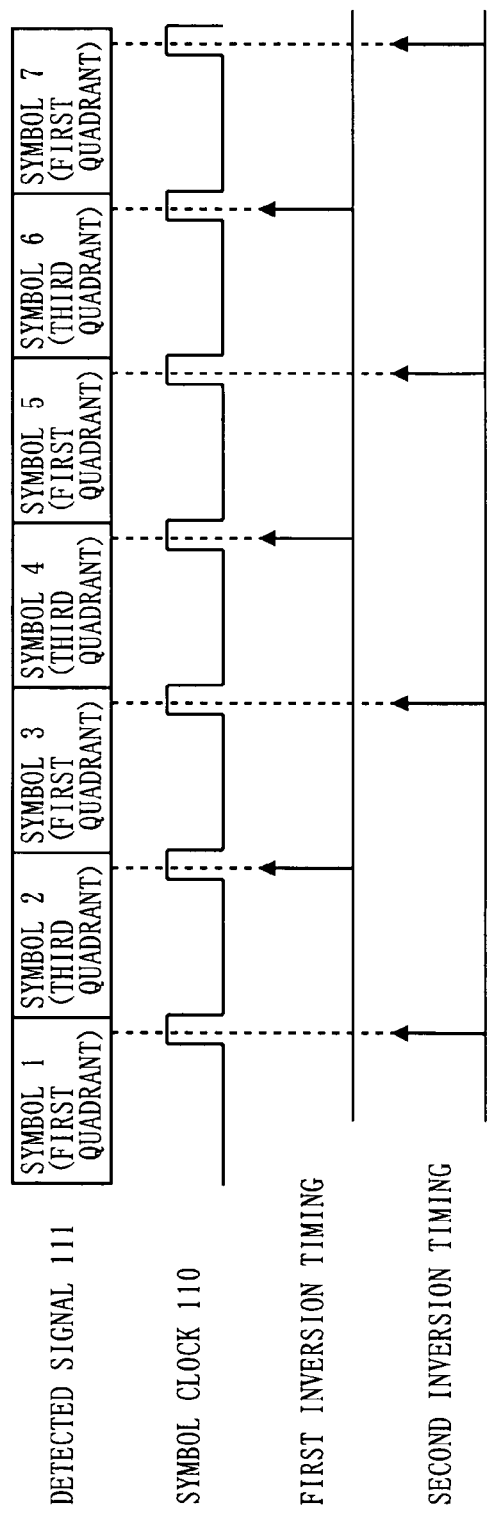
FIG. 8 is a chart illustrating a symbol inversion timing when a PR portion is input to the phase error correction circuit shown in FIG. 1.
Figure 9A:
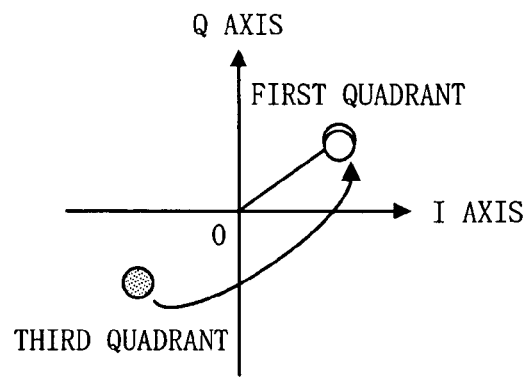
FIGS. 9A and 9B are charts illustrating manners in which symbols are gathered into a certain quadrant of an IQ coordinate system due to the action of a phase inversion section included in the phase error correction circuit shown in FIG. 1.
Figure 9B:
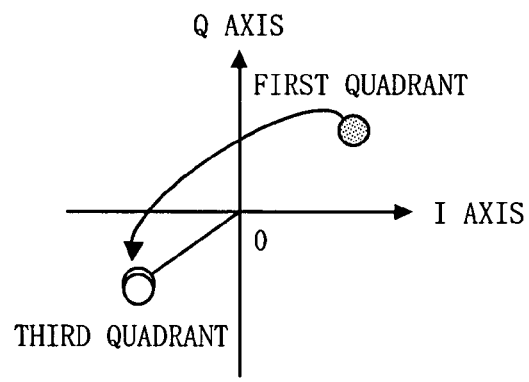

The process of calculating the second mean vector 612 based on the detected signal 111 will be more specifically described. FIG. 8 is a chart illustrating a symbol inversion timing when a PR portion is input to the phase inversion section 601. FIGS. 9A and 9B are charts illustrating manners in which symbols are gathered into a certain quadrant of an IQ coordinate system due to the action of the phase inversion section 601. In FIGS. 8, 9A, and 9B, it is assumed that the detected signal 111 has a phase shift occurring in a positive direction.

As shown in FIG. 8, the detected signal 111 which is supplied to the phase inversion section 601 varies in synchronization with the symbol clock 110. If the detected signal 111 contains a PR potion, its symbols will alternate (i.e., the phase will be inverted by 180° for each symbol). Assuming that the detected signal 111 has a phase shift occurring in a positive direction, the symbols of the detected signal 111 are alternately located in the first quadrant and the third quadrant of the IQ coordinate system. The phase inversion section 601 inverts the phase of the detected signal 111 containing such symbol alternations by 180° for every other symbol. As a result, if phase inversions are performed with a first inversion timing shown in FIG. 8, the symbols will concentrate in the first quadrant as shown in FIG. 9A. If phase inversions are performed with a second inversion timing which is one symbol period apart from the first inversion timing, the symbols will concentrate in the third quadrant as shown in FIG. 9B.

Thus, if the detected signal 111 has a phase shift occurring in a positive direction, the symbols contained in the output signal from the phase inversion section 601 will concentrate in the first or third quadrant. Similarly, if the detected signal 111 has a phase shift occurring in a negative direction, the symbols contained in the output signal from the phase inversion section 601 will concentrate in the second or fourth quadrant. The averaging section 602 outputs the first mean vector 611 by deriving a mean value with respect to the symbols which have thus been gathered into a single quadrant. Thus, the first mean vector 611 will exist in any one of the first to fourth quadrants, depending on the phase shift occurring in the detected signal 111 and the inversion timing by the phase inversion section 601.

Figure 10:
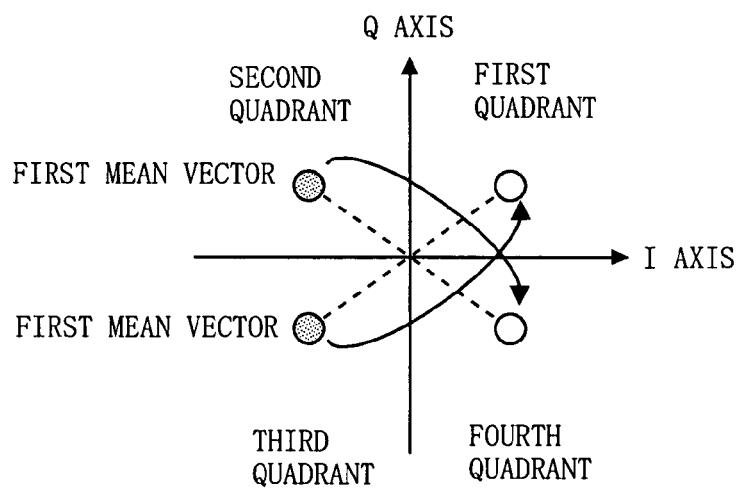
FIG. 10 is a chart illustrating a manner in which symbols are gathered into a first or fourth quadrant of an IQ coordinate system due to the action of a mean vector phase inversion section included in the phase error correction circuit shown in FIG. 1.

In order to uniquely determine the direction of correction, the mean vector phase inversion section 603 performs a process of moving the phase shift toward the first or fourth quadrant. FIG. 10 is a chart illustrating a manner in which symbols are gathered into the first or fourth quadrant of the IQ coordinate system due to the action of the mean vector phase inversion section 603. As described above, the mean vector phase inversion section 603 inverts the phase of the first mean vector 611 by 180° when the I axis component of the first mean vector 611 is negative. As a result, when the first mean vector 611 is in the first, second, third, or fourth quadrant, the second mean vector 612 will be located in the first, fourth, first, or fourth quadrant, respectively. Thus, from the mean vector phase inversion section 603, the second mean vector 612 is output so as to be located in the first or fourth quadrant.

Figure 11:
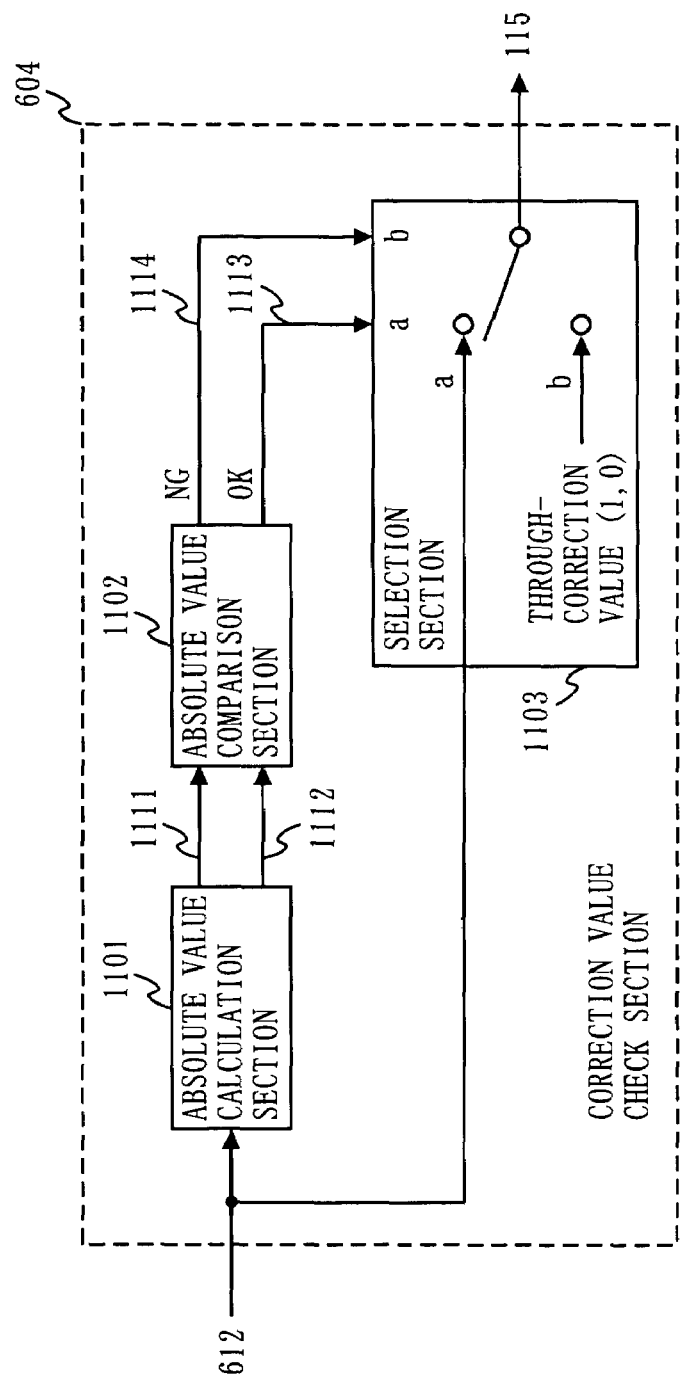
FIG. 11 is a block diagram illustrating the detailed structure of a correction value check section included in the phase error correction circuit shown in FIG. 1.

FIG. 11 is a block diagram illustrating the detailed structure of the correction value check section 604. The correction value check section 604 includes an absolute value calculation section 1101, an absolute value comparison section 1102, and a selection section 1103. The correction value check section 604 determines whether the phase angle of the second mean vector 612 falls within a predetermined range. Only if the phase angle of the second mean vector 612 is within the predetermined range does the correction value check section 604 output the second mean vector 612 itself as the correction value 115.

In FIG. 11, the absolute value calculation section 1101 calculates an absolute value 1111 of the I axis component and an absolute value 1112 of the Q axis component of the second mean vector 612. Based on a ratio between the two absolute values 1111 and 1112, the absolute value comparison section 1102 selectively outputs either a permission signal 1113 or a non-permission signal 1114. More specifically, assuming that the absolute value 1111 of the I axis component has a value X and that the absolute value 1112 of the Q axis component has a value Y, the absolute value comparison section 1102 derives a ratio Y/X. If the derived ratio Y/X is equal to or less than the predetermined valuer, the absolute value comparison section 1102 outputs the permission signal 1113 if the derived ratio Y/X is equal to or less than the predetermined value r, and otherwise outputs the non-permission signal 1114. In particular, if the predetermined value r is "2", comparing the ratio Y/X against the predetermined value r is equivalent to determining whether eq. 3 below is true or not:

$$2X - Y \geq 0 \qquad \text{eq. 3}$$

Figure 12:
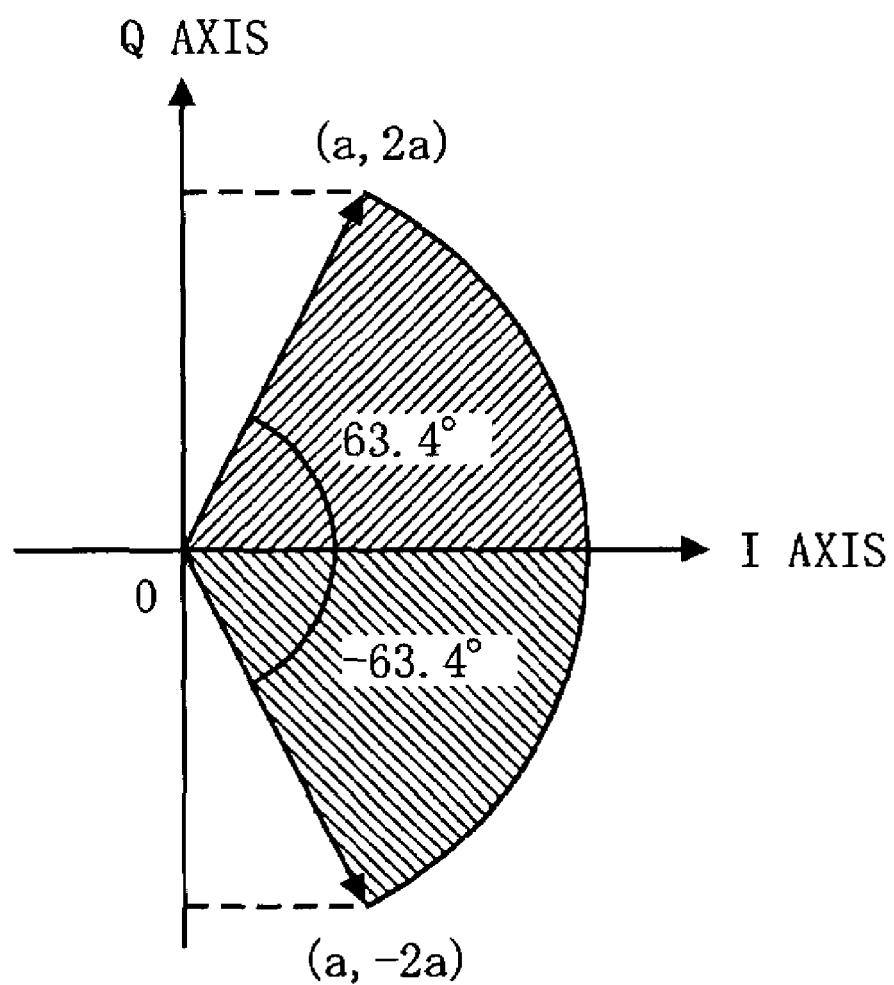
FIG. 12 is a chart illustrating an exemplary region in which a second mean vector calculated by the phase error correction circuit shown in FIG. 1 is determined as valid.

Since $\tan^{-1} 2 = 63.4$ degrees, by determining whether eq. 3 above is true or not, it is possible to determine whether the phase shift in the detected signal 111 is within ±63.4 degrees or not, that is, whether or not the second mean vector 612 exists in the area which is shown hatched in FIG. 12. A number a shown in FIG. 12 is a positive number.

As the correction value 115, the selection section 1103 outputs the second mean vector 612 when the permission signal 1113 is output, or outputs a through-correction value when the non-permission signal 1114 is output. As used herein, the through-correction value is a correction value which results in no rotation being applied by the process performed by the phase rotation section 104, i.e., a vector (1, 0) (where the I axis component is "1" and the Q axis component is "0"). Note that the correction value check section 604 may function in such a manner that it outputs the second mean vector 612 itself as the correction value 115 only if the calculated value of the phase angle (i.e., an angle with respect to positive direction of the I axis in the IQ coordinate system) of the second mean vector 612 falls within a predetermined range.

The effect of the correction value calculation section 102 having the above structure will be described. The first mean vector 611 is a vector obtained by averaging the detected signal 111 which is input while the alternation detection signal 113 is valid (i.e., while consecutive symbol alternations are detected). As a result, even if the symbol alternations in the PR portion are affected due to noise or the like, it is still possible to calculate accurate correction values by avoiding portions which would unfavorably affect the correction value calculation. By smoothing the detected signal 111 by means of the averaging section 602, accurate correction values can be calculated even when the phase error correction circuit is used in a noisy environment.

Using the effective correction value 118 which is selected from among the correction values 115 derived by the correction value calculation section 102, the phase rotation section 104 performs a phase rotation process for the detected signal 111. However, if the correction angle is too large, the phase error correction circuit 1 may erroneously receive an unwanted signal of another frequency channel. Therefore, the correction value check section 604 determines whether the phase angle of the second mean vector 612 is within a predetermined range, thereby determining whether the signal is to be demodulated or not. As a result, erroneous receiving of an unwanted signal of another frequency channel can be prevented. Since the calculation of eq. 3 can be realized through a bit shift process and an addition process, the use of eq. 3 for the determination of the second mean vector 612 allows the correction value check section 604 to be constructed of simple circuitry.

Figure 13:
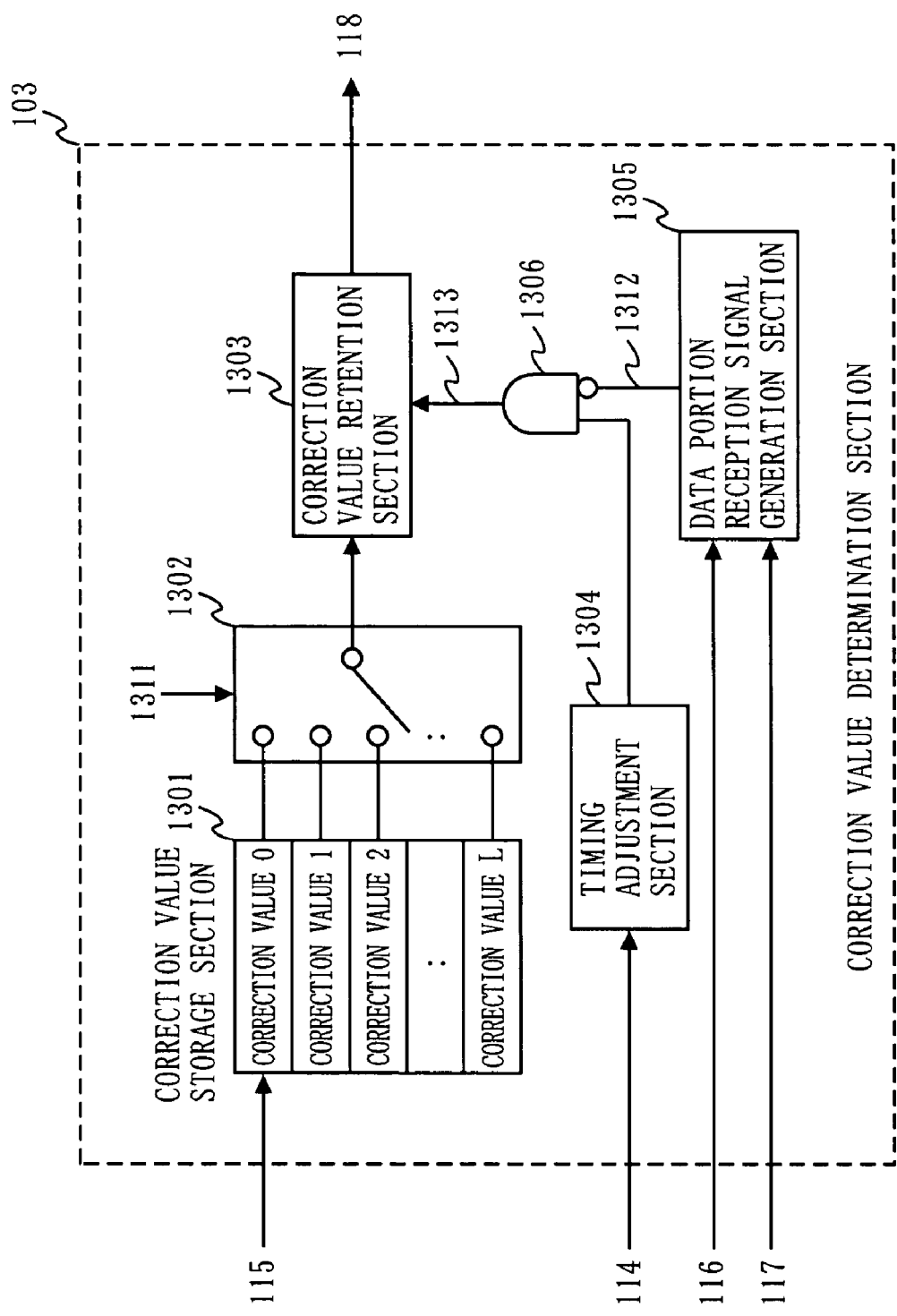
FIG. 13 is a block diagram illustrating the detailed structure of a correction value determination section included in the phase error correction circuit shown in FIG. 1.

FIG. 13 is a block diagram illustrating the detailed structure of the correction value determination section 103. The correction value determination section 103 includes a correction value storage section 1301, correction value selection section 1302, correction value retention section 1303, timing adjustment section 1304, data portion reception signal generation section 1305, and a logic gate 1306. The correction value storage section 1301, which is composed of a memory, a shift register, or the like, stores the correction values 115 calculated by the correction value calculation section 102. More specifically, the correction value storage section 1301 stores the most recent (L+1) correction values 115 (where L is an integer equal to or greater than 0) in a chronological order. A number-of-correction-values-to-go-back 1311, which is an integer equal to or greater than 0 and equal to or less than L, is input to the correction value selection section 1302. Among the (L+1) correction values stored in the correction value storage section 1301, the correction value selection section 1302 selects and outputs a correction value which is arrived at by going back in time in accordance with the number-of-correction-values-to-go-back 1311. For example, if the number-of-correction-values-to-go-back 1311 is "2", the correction value selection section 1302 outputs a correction value which is arrived at by going two correction values back from the most recently calculated correction value (i.e., correction value 2 in FIG. 13).

In order to ensure that the timing at which the correction value calculation signal 114 is output coincides with the timing at which the correction value 115 is output from the correction value calculation section 102, the timing adjustment section 1304 delays the correction value calculation signal 114 by a predetermined amount of time. Based on the UW detection signal 116 and the frame end detection signal 117, the data portion reception signal generation section 1305 generates a data portion reception signal 1312 indicating that a data portion is being received. More specifically, the data portion reception signal generation section 1305 outputs a data portion reception signal 1312 which stays valid during a period which exists after the UW detection signal 116 is input and until the frame end detection signal 117 is input. The logic gate 1306 outputs a logical AND of the NOT of the data portion reception signal 1312 and the correction value calculation signal after the timing adjustment, as an update signal 1313. Upon receiving the update signal 1313, the correction value retention section 1303 fetches the correction value which has been selected by the correction value selection section 1302 and retains it. The correction value which is retained in the correction value retention section 1303 is supplied to the phase rotation section 104 as the effective correction value 118.

Thus, the correction value determination section 103 stores (L+1) correction values which are calculated by the correction value calculation section 102, and when the UW detection signal 116 is input, selects one of the stored correction values and outputs it as the effective correction value 118.

The effect of the correction value determination section 103 having the above structure will be described. The correction value calculation section 102 calculates a correction value 115 each time consecutive symbol alternations are detected, which is expected to occur while the PR portion is being received. However, consecutive symbol alternations may be detected not only while the PR portion is being received but also while the UW portion or the data portion is being received, because the original data pattern may contain symbol alternations, or the original data pattern may be altered by noise or the like so as to resemble symbol alternations. The correction value calculation section 102 will calculate correction values 115 even in response to consecutive symbol alternations which are detected while the UW portion or the data portion is being received; however, such correction values will only result in an erroneous correction, and therefore should not be used for the phase rotation process by the phase rotation section 104. Since the characteristics of the detected signal 111 will improve toward the later part of the PR portion, it is desirable for the correction value determination section 103 to select, as the effective correction value 118, a correction value which is calculated as late in the PR portion as possible. Since the detected signal 111 has a frame structure as shown in FIG. 3, the phase error correction circuit 1 will receive the UW portion following the PR portion. Therefore, detecting a later part of the PR portion would be substantially equivalent to detecting the UW portion.

Accordingly, based on the UW detection signal 116 and the frame end detection signal 117, the correction value determination section 103 generates the data portion reception signal 1312, which indicates that a data portion is being received. Based on the data portion reception signal 1312, the correction value determination section 103 operates as follows: while a data portion is not being received, the correction value determination section 103 fetches the correction value selected by the correction value selection section 1302 each time a new correction value 115 is calculated; while the data portion is being received, the correction value determination section 103 retains the already-fetched correction value. Thus, the correction value determination section 103 keeps updating the effective correction value 118 while the PR portion is being received; when the UW portion is detected, the correction value determination section 103 retains the correction value which has been selected by the correction value selection section 1302 as the effective correction value 118; while the data portion is being received, the correction value determination section 103 stops updating the effective correction value 118. As a result, while the data portion is being received, the correction value determination section 103 is able to output to the phase rotation section 104 a correction value which is guaranteed to have been calculated at the later part of the PR portion. In particular, the correction value determination section 103 may fetch and retain a correction value 115 which has been calculated by the correction value calculation section 102 with respect to a portion that contains the last symbol of the preamble.

Figure 14:
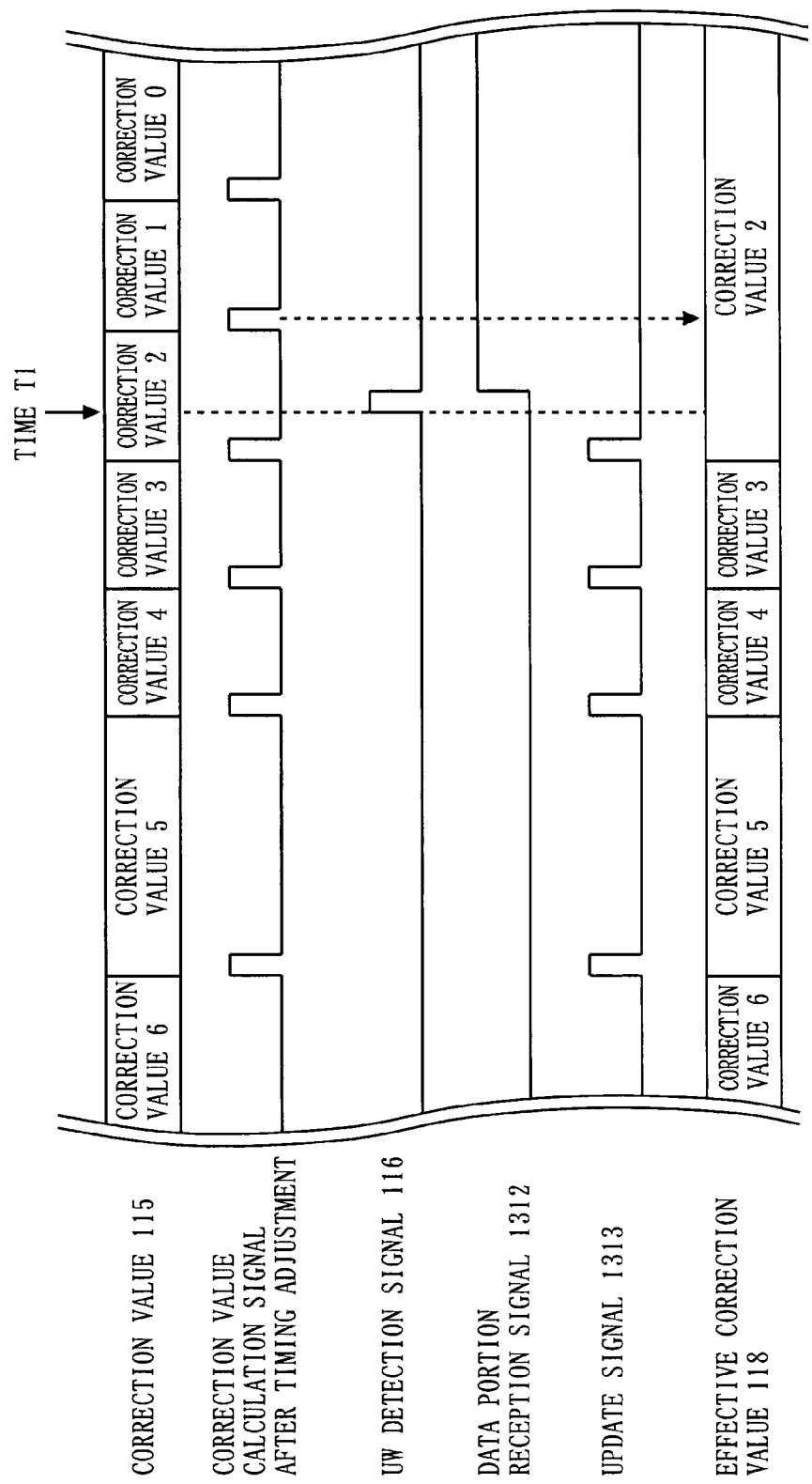
FIG. 14 is a timing chart illustrating the behavior of input/output signals and internal signals of a correction value determination section included in the phase error correction circuit shown in FIG. 1.

FIG. 14 is a timing chart illustrating the behavior of input/output signals and internal signals of the correction value determination section 103. To the correction value determination section 103, correction values which are calculated by the correction value calculation section 102 and the correction value calculation signal 114, which indicates the timing at which the correction value determination section 103 outputs correction values 115, are input. The correction value calculation signal shown in FIG. 14 is one that has undergone the timing adjustment by the timing adjustment section 1304.

Until the UW detection signal 116 is input (i.e., before time T1 in FIG. 14), the data portion reception signal 1312 is invalid (Low level); therefore, the update signal 1313 varies in a similar manner to the correction value calculation signal after the timing adjustment. Therefore, until the UW detection signal 116 is input, the correction value retention section 1303 updates the effective correction value 118 each time the correction value calculation signal 114 is input.

Once the UW detection signal 116 is input (i.e., after time T1), the data portion reception signal 1312 becomes valid (High level); therefore, the correction value calculation signal 114 is masked by the action of the logic gate 1306, so that the update signal 1313 remains invalid (Low level). Consequently, after the UW detection signal 116 is input, the correction value retention section 1303 does not update the effective correction value 118 even if the correction value calculation signal 114 is input, and retains the previous effective correction value 118.

When the frame end detection signal 117 is thereafter input (not shown), the data portion reception signal 1312 again becomes invalid, and the correction value retention section 1303 restarts updating of the effective correction value 118. Thus, the correction value determination section 103 prohibits update of the effective correction value 118 while the data portion is being received, and restarts updating of the effective correction value 118 after the reception of the frame is completed.

Described below is the reason why the correction value determination section 103 stores the correction values 115 in a chronological order and selects, as the effective correction value 118, a correction value which is arrived at by going back in all the stored correction values when the UW portion is detected.

Figure 15:
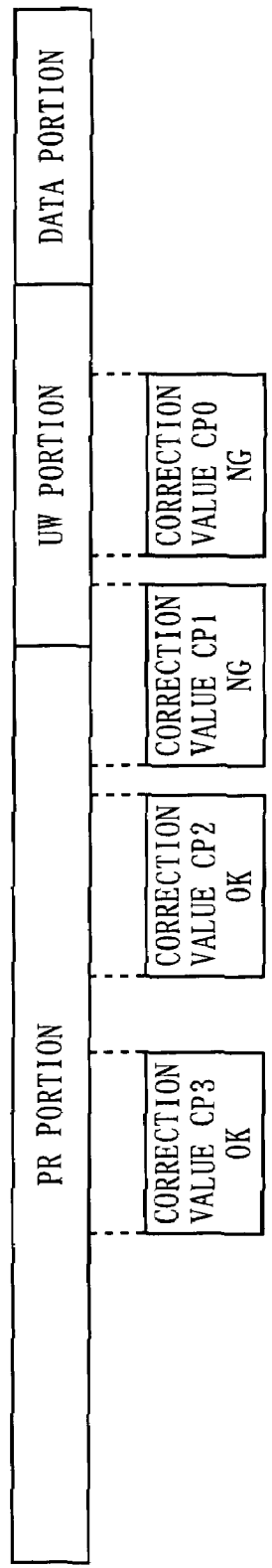
FIG. 15 is a diagram illustrating a manner in which correction values are calculated near the end of a PR portion in the phase error correction circuit shown in FIG. 1.

FIG. 15 is a diagram illustrating a manner in which correction values are calculated near the end of a PR portion. The correction values 115 are calculated in response to the detection of consecutive symbol alternations, and are expected to be calculated while the PR portion is being received (as are correction values CP3 and CP2 shown in FIG. 15). However, it is possible for a new correction value 115 to be calculated after the reception of the PR portion is completed and before the update of the effective correction value 118 is stopped upon detection of the UW portion. Specifically, as shown in FIG. 15, a correction value 115 may be calculated while the UW portion is being received (e.g., correction value CP0), or while the vicinity of the end of the PR portion and the beginning of the UW portion is being received (e.g., correction value CP1). As mentioned earlier, using correction values which have been calculated with respect to any portion other than the PR portion to perform a phase rotation process might result in an erroneous correction.

Therefore, the correction value determination section 103 stores a predetermined number of correction values 115 to the correction value storage section 1301 in a chronological order, and when the UW portion is detected, selects a correction value which is arrived at by going back in time in accordance with the number-of-correction-values-to-go-back 1311 among all the correction values stored up to that moment, as the effective correction value 118. This ensures that the phase rotation section 104 performs a phase rotation process by only using correction values which are calculated while the PR portion is being received.

The number of correction values 115 to be stored in the correction value determination section 103 is equal to the number of consecutive symbol alternations that are erroneously detected at the UW portion (or astride the PR portion and the UW portion), and therefore depends on the data pattern of the UW portion. Accordingly, by appropriately selecting the data pattern of the UW portion, the number of erroneous detections of consecutive symbol alternations can be reduced, which makes it possible to reduce the necessary number of correction values to go back, and hence the circuitry scale of the correction value storage section 1301. Preferable methods of selecting the data pattern for the UW portion will be described after the description of the present embodiment.

Next, the timing with which to restart update of the effective correction value 118 will be discussed. In the case where it is guaranteed that any two adjacent frames will be input with a certain time interval when the detected signal 111 is input to the phase error correction circuit 1, the data portion reception signal generation section 1305 may inactivate the data portion reception signal 1312 immediately when the frame end detection signal 117 is input. On the other hand, in the case where two adjacent frames are input with a relatively short time interval therebetween (i.e., in the case where frames are transmitted substantially continuously), it is preferable that the data portion reception signal generation section 1305 keep the data portion reception signal 1312 valid for a predetermined amount of time even after the frame end detection signal 117 is input. The reasons are as follows.

Figure 16:
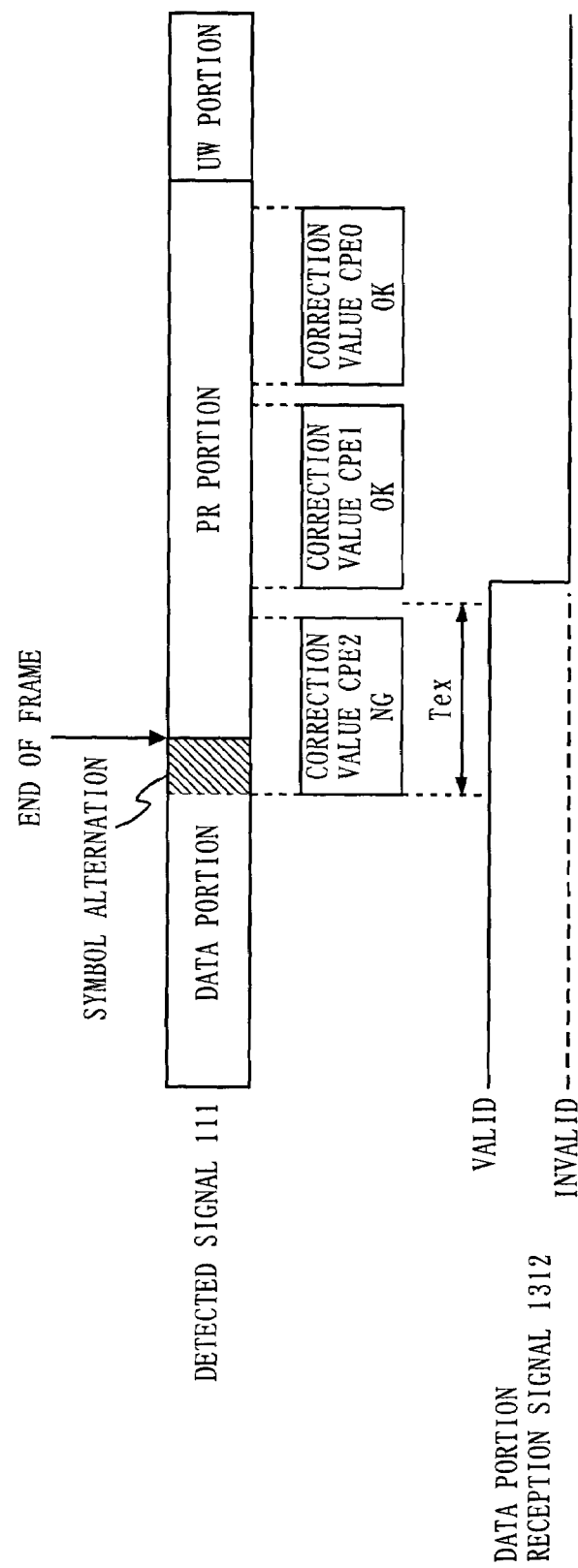
FIG. 16 is a diagram illustrating a manner in which correction values are calculated at the end of a frame in the phase error correction circuit shown in FIG. 1, in the case where frames are continuously received.

FIG. 16 is a diagram illustrating a manner in which correction values are calculated at the end of a frame in the case where frames are continuously transmitted. In this example, it is assumed that consecutive symbol alternations are included at the end (shown hatched) of the data portion of a preceding frame. In this case, assuming that the update of the effective correction value 118 is to be restarted when the end of a frame is detected, it might be possible for the correction value determination section 103 to store a correction value which is calculated at the end of the data portion and later output it as the effective correction value 118. In order to prevent this problem, the data portion reception signal generation section 1305 keeps the data portion reception signal 1312 valid for a predetermined amount of time ($T_{ex}$ in FIG. 16) after the frame end detection signal 117 is input. Thus, by extending the period of time during which the data portion reception signal 1312 is valid, phase rotation processes using an unwanted correction value which was calculated near the end of a frame can be prevented, thereby ensuring proper correction of the phase shift in the detected signal 111.

Next, a method of enhancing the accuracy of detecting the UW portion will be described. Since the phase error correction circuit 1 determines the effective correction value 118 upon detection of a UW portion, it is necessary to properly and securely detect the UW portion. Therefore, in order to prevent misdetection of the UW portion, the phase error correction circuit 1 keeps the UW detection signal 116 valid only during a period which exists after the PR portion is detected and until the UW detection signal 116 is expected to be issued (hereinafter referred to as an "aperture period"). More specifically, the phase error correction circuit 1 employs an aperture period signal, which stays valid for a predetermined amount of time after the correction value calculation signal 114 (which indicates the detection of a predetermined number of consecutive symbol alternations in the PR portion) becomes valid, and keeps the UW detection signal 116 valid only while the aperture period signal is valid.

Figure 17:
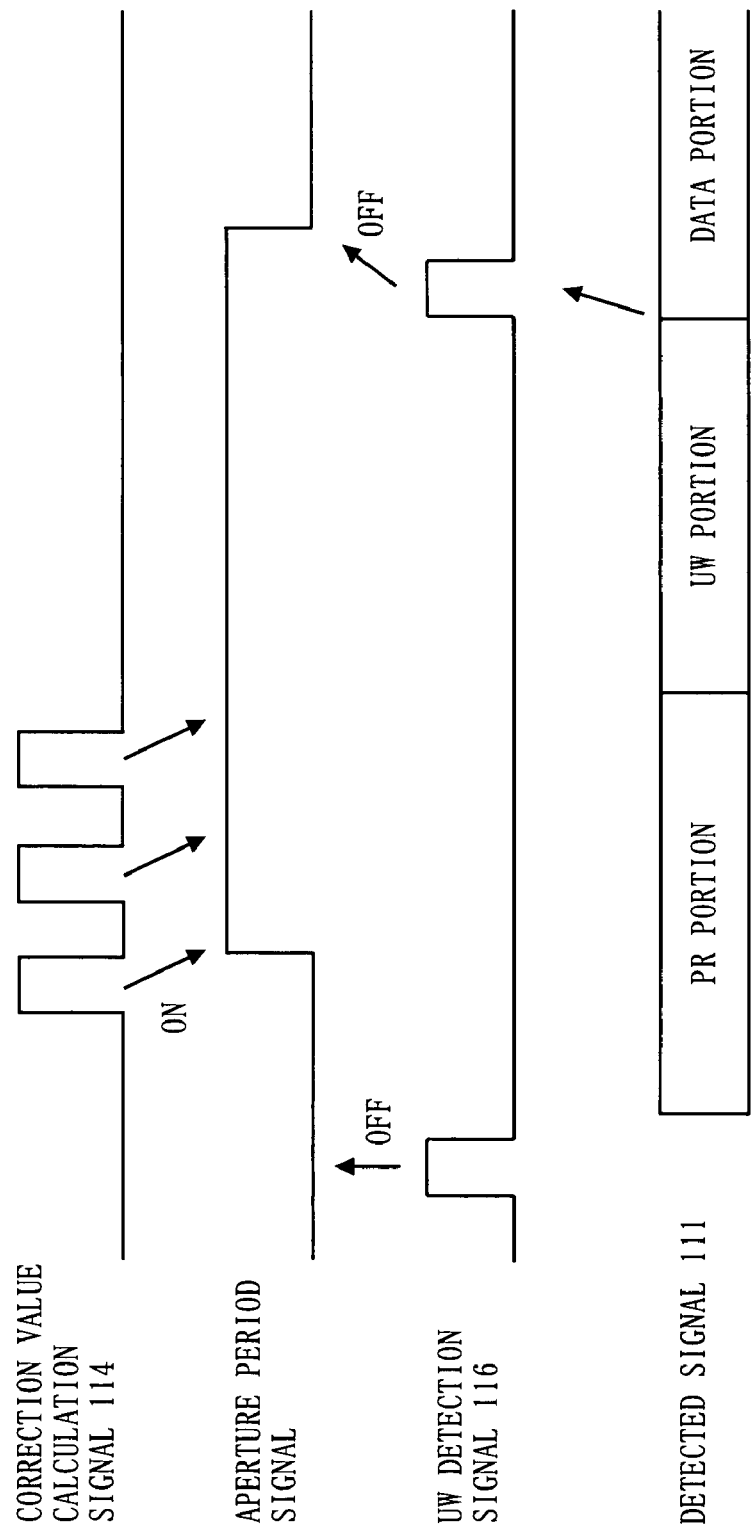
FIG. 17 is a timing chart illustrating the behavior of an aperture period signal in the phase error correction circuit shown in FIG. 1.

FIG. 17 is a timing chart illustrating the behavior of the aperture period signal. The aperture period signal becomes valid when the correction value calculation signal 114 becomes valid, and becomes invalid when an aperture period is over or when the UW detection signal 116 is input. In the example shown in FIG. 17, the correction value calculation signal 114 is output three times, and an aperture period is restarted every time the correction value calculation signal 114 is output. Therefore, the UW detection signal 116 is valid only if it is output within the aforementioned predetermined amount of time from a point when the correction value calculation signal 114 is last output. By thus defining the aperture period and ensuring that the UW portion is detected only during the aperture period, the probability of properly detecting the UW portion is improved, such that a proper effective correction value 118 can be obtained with an improved probability. By generating the aperture period signal based on the correction value calculation signal 114, which in turn is generated based on the sign bit 112 of the detected signal 111, it becomes possible to easily construct a circuit for generating the aperture period signal on a smaller circuitry scale.

As described above, in accordance with the phase error correction circuit of the present embodiment, a detected signal containing a PR portion, a UW portion, and a data portion is subjected to a phase correction by using retained phase correction values. When the UW portion is detected, a correction value which has been calculated with respect to the PR portion is retained as a phase correction value to be used in future. Thus, by performing phase correction by using a phase correction value which has been calculated with respect to the PR portion, rather than phase correction values which have been calculated with respect to the UW portion or the data portion, it becomes possible to perform a highly accurate phase correction. By regarding a predetermined number of consecutive symbol alternations as the PR portion, it becomes possible to detect the PR portion by using simple circuitry. By keeping the UW detection signal valid only for a predetermined amount of time after symbol alternations are detected, misdetection of the UW portion can be prevented. By calculating correction values only while symbol alternations are being detected, the accuracy of the correction value can be improved. By employing a mean value of a predetermined number of symbols in the detected signal as a correction value, it becomes possible to attenuate the influence of the noise contained in the symbols or the like, whereby the accuracy of the correction value can be improved. By ensuring that the detected signal is not subjected to phase correction if a calculated correction value is not within a predetermined range, erroneous receiving of an unwanted signal of another frequency channel can be prevented. By stopping the update of correction values after the UW portion is detected, it is ensured that unwanted correction values which are calculated with respect to the UW portion or the data portion are not used. Since the correction values are not updated for a while after the end of a frame is detected, it is ensured that unwanted correction values which were calculated near the end of a frame are not used.

Although the above illustrates an example of using correction values which are calculated at as late a part in the PR portion as possible, the exact timing with which gain control becomes stable in a receiver might vary depending on the structure of the receiver and/or the state of the communication path. Therefore, in the case of a receiver in which gain control becomes stable at a relatively early point while the preamble is being received (e.g., at a point when about one third of the preamble has been received), it is not necessary to use correction values which are calculated at as late a part in the PR portion as possible; rather, correction values which are calculated at any point after gain control has been stabilized may be used.

Figure 18:
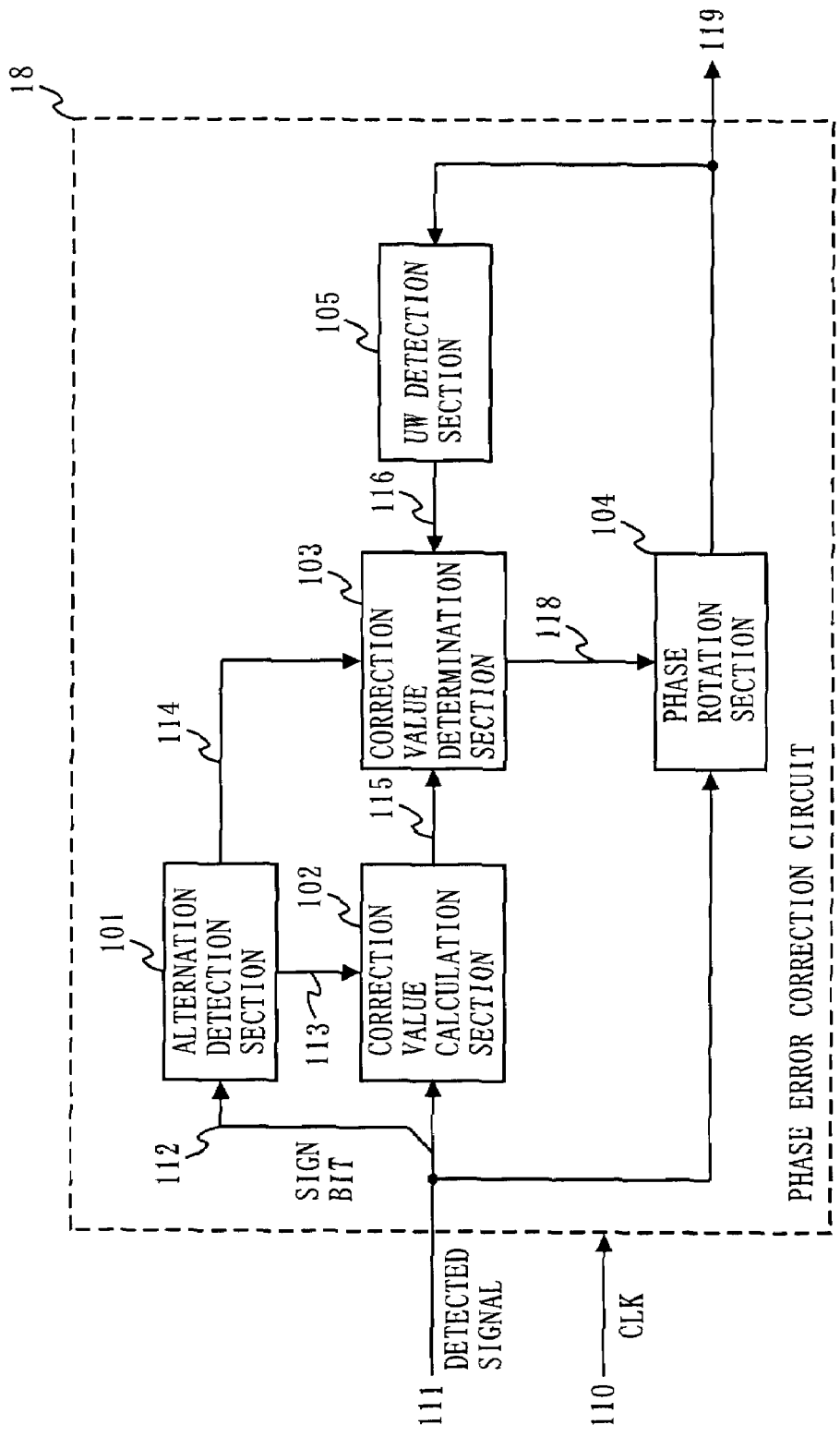
FIG. 18 is a block diagram illustrating the structure of a phase error correction circuit according to a first variant of the first embodiment of the present invention.

Hereinafter, variants of the phase error correction circuit 1 will be described. The phase error correction circuit 1 according to the above embodiment was illustrated as comprising the frame end detection section 106, such that the update of the effective correction value 118 is restarted when the end of a frame is detected. Such a phase error correction circuit 1 would be effective both in the case where frames are continuously received and in the case where frames are not continuously received. In limited applications directed to the case where frames are not continuously received, the phase error correction circuit does not need to include the frame end detection section 106. FIG. 18 is a block diagram illustrating the structure of a phase error correction circuit 18 according to a first variant of the first embodiment of the present invention. The phase error correction circuit 18 is identical to the phase error correction circuit 1 according to the first embodiment, except that the frame end detection section 106 is omitted therefrom. The phase error correction circuit 18 does not detect the end of a frame, but makes the data portion reception signal 1312 valid when the correction value calculation signal 114 becomes valid, for example. The phase error correction circuit 18 according to this first variant can be used in the case where frames are not continuously received, and provides similar effects to those of the phase error correction circuit 1 according to the first embodiment.

Figure 19:
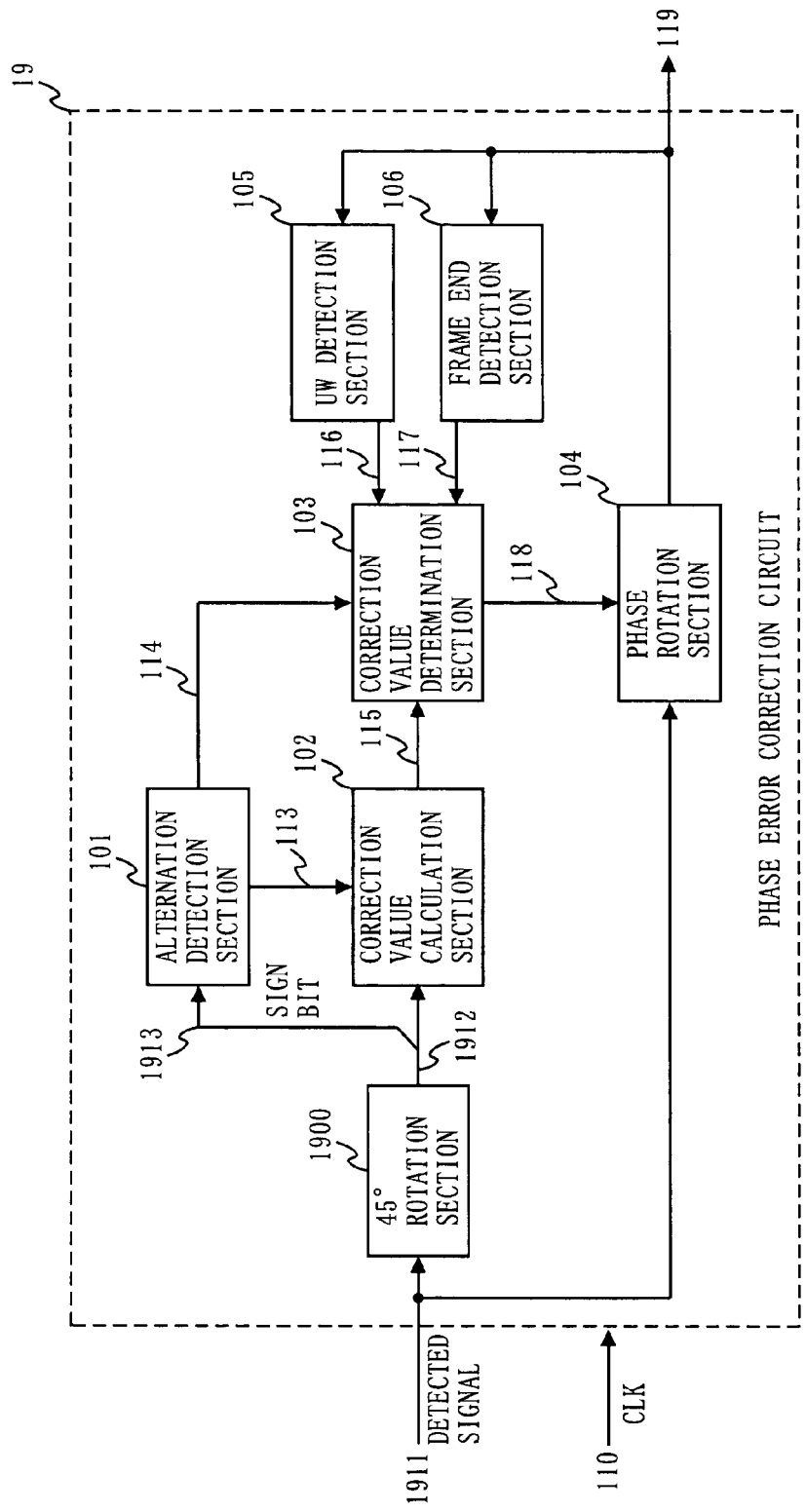
FIG. 19 is a block diagram illustrating the structure of a phase error correction circuit according to a second variant of the first embodiment of the present invention.

Although the detected signal 111 is assumed to be a signal obtained by subjecting a QPSK modulated signal to delay detection in the phase error correction circuit 1 according to the present embodiment, the detected signal 111 may have been modulated by any other method. For example, the modulation method used for the detected signal 111 may be a multi-phase modulation technique such as 8-phase PSK (Phase Shift Keying), or a multi-amplitude phase modulation technique such as QAM (Quadrature Amplitude Modulation). FIG. 19 is a block diagram illustrating the structure of a phase error correction circuit 19 according to a second variant of the first embodiment of the present invention. The phase error correction circuit 19 is obtained by adding a 45° rotation section 1900 for rotating the phase of the detected signal 1911 by 45° to the phase error correction circuit 1 according to the first embodiment, in front of the alternation detection section 101 and the correction value calculation section 102. A rotated detected signal 1912 which is output from the 45° rotation section 1900 is input to the correction value calculation section 102, and a sign bit 1913 of the detected signal 1912 is input to the alternation detection section 101. The phase error correction circuit 19 according to this second variant can be used in the case where the detected signal 1911 is modulated by π/4 shift QPSK or the like, and provides similar effects to those of the phase error correction circuit 1 according to the first embodiment.

(Data Pattern of the UW Portion)

Described below are: the reason why the alternation detection section 101 would erroneously detect the data pattern of the UW portion to be symbol alternations spanning a predetermined length; the relationship between the data pattern of the UW portion and the number of correction values to go back; and preferable methods of selecting the data pattern for the UW portion so as to prevent erroneous detections of symbol alternations.

Figure 20:
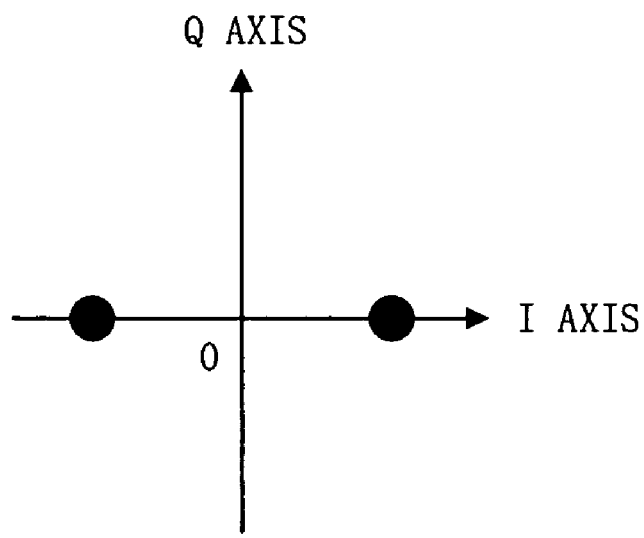
FIG. 20 is an exemplary constellation pattern of a PR portion of a detected signal which is input to the phase error correction circuit shown in FIG. 1.
Figure 21:
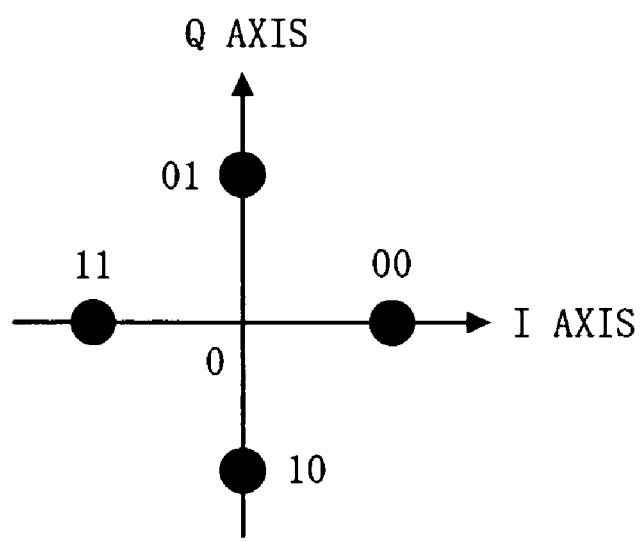
FIG. 21 is an exemplary constellation pattern of a UW portion or a data portion of a detected signal which is input to the phase error correction circuit shown in FIG. 1.

First, the reasons why the data pattern of the UW portion may be altered due to noise or the like and why the alternation detection section 10 may erroneously output the symbol alternation detection signal 113 will be described. As described earlier, data pattern with phase differences alternating by 180° between adjacent symbols is used for the PR portion. The following description will illustrate a case where, as shown in FIG. 20, the constellation of the PR portion is at 0° and 180°, and the detected signal 111 is a signal obtained by subjecting a QPSK modulated signal to delay detection. It is also assumed that, as shown in FIG. 21, two-bit symbol data "00", "01", "11", and "10" are respectively assigned for positions 0°, 90°, 180°, and 270°. For ease of understanding, it is further assumed that no phase shift is occurring in the detected signal, and that no noise is contained therein.

The alternation detection section 101 determines symbol alternations based on the sign bit 112 of the detected signal 111. More specifically, the alternation detection section 101 determines, in a situation where the symbols contained in the detected signal 111 are deployed in an IQ coordinate system shown in FIG. 20, whether each symbol is in a right-hand region (hereinafter referred to as the "positive region") or the left-hand region (hereinafter referred to as the "negative region") of the Q axis. However, when the symbol data is "01" or "10", these signals are just on the Q axis. Therefore, the alternation detection section 101 cannot properly determine the signs of such symbols, and may erroneously determine them as being in the "positive region" or the "negative region".

On the other hand, a data pattern containing symbol alternations is used for the PR portion, this symbol data having a pattern with alternating "00"s and "11"s. Since the threshold for sign errors is relatively high, the chances of misjudging "00" as "11" and the chances of misjudging "11" as "00" are small. In other words, while the PR portion is being received, the chances of the alternation detection section 101 misjudging a signal in the positive region as a signal in the negative region, or misjudging a signal in the negative region as a signal in the positive region, are also small. Therefore, in most cases, while the PR portion is being received, the alternation detection section 101 will properly detect symbol alternations, and the correction value calculation section 102 will calculate proper correction values. Even if "00" is misjudged as "11", or if "11" is misjudged as "00", the signs of two adjacent symbols are identical, so that the alternation detection section 101 is unable to detect consecutive symbol alternations, and the correction value calculation section 102 will not calculate a correction value.

For the UW portion, a data pattern different from that of the PR portion is generally used. Therefore, the alternation detection section 101 may misjudge "01" as "00" or "11", or misjudge "10" as "00" or "11", thereby determining the data pattern of the UW portion to be symbol alternations. For example, a case will be described where a 31 bit-long PN (Pseudo Noise) code "1100010101101000011001001111101" (hereinafter referred to as "pattern P1"), whose generation polynomial can be expressed as $(1+X+X^2+X^3+X^5)$, is used as the data pattern of the UW portion. In the following example, it is assumed that the alternation detection section 101 outputs the symbol alternation detection signal 113 when symbol alternations are detected for a length of eight symbols (i.e., when seven symbol alternations are consecutively detected).

In order to see how pattern P1 would fit on a constellation, pattern P1 may be represented as a number of symbol data, as shown in FIG. 22A, by being split into units of two bits from the beginning. Note that "-" contained in the last symbol data shown in FIG. 22A corresponds to the first one bit of the data portion which follows the UW portion, and represents a value which may take either "0" or "1". As described above, "01" may be misjudged as "00" or "11", and "10" may be misjudged as "00" or "11" in certain cases. Therefore, by regarding the symbol data "01" and "10" as symbol data which may become "00" or "11" through misjudgment, the symbol data "01" and "10" can be expressed in the form of wild cards "", resulting in a pattern shown in FIG. 22B**.

In FIG. 22B, the third to seventh symbol data are all wild cards "". Therefore, if the alternation detection section 101 misjudges the third, fifth, and the seventh symbol data as "11", and the fourth and sixth symbol data as "00", symbol alternations for a length of eight symbols, from the first to eighth symbol data, will emerge. In this case, the alternation detection section 101 will output the symbol alternation detection signal 113, causing the correction value calculation section 102 to calculate a correction value 115 with respect to the first to eighth symbol data, so that the correction value will be stored to the correction value storage section 1301 in the correction value determination section 103. As a result, depending on the value of the number-of-correction-values-to-go-back 1311, the correction value which is erroneously calculated with respect to the first to eighth symbol data of the UW portion may be selected as the effective correction value 118, resulting in an improper phase correction being performed by the phase rotation section 104**.

In the case of pattern P1, symbol alternations for a length of eight symbols due to misdetections may occur in the following six permutations, including the above-illustrated example.

| | |
|---|---|
| (a) first to eighth: | "11 00 ** ** ** ** ** 00" |
| (b) second to ninth: | "00 ** ** ** ** ** 00 **" |
| (c) third to tenth: | "** ** ** ** ** 00 ** **" |
| (d) fourth to eleventh: | "** ** ** ** 00 ** ** **" |
| (e) fifth to twelfth: | "** ** ** 00 ** ** ** 00" |
| (f) sixth to thirteenth: | "** ** 00 ** ** ** 00 11" |

If one takes into consideration the data pattern of the PR portion which lies immediately before the UW portion, due to misdetections in the UW portion, seven more permutations are possible for symbol alternations for a length of eight symbols astride the PR portion and the UW portion. Therefore, if pattern P1 is used as the data pattern for the UW portion, symbol alternations for a length of eight symbols may possibly be detected in a total of thirteen permutations, resulting in unwanted correction values being calculated.

In order to avoid such erroneous detections of consecutive symbol alternations, a data pattern may be selected for the UW portion such that symbol alternations will not be detected for a predetermined number of times even in the case where symbol data are misdetected. For example, a case will be described where another 31 bit-long PN code "1111000110111010100001001011001" (hereinafter referred to as "pattern P2"), whose generation polynomial can be expressed as $(1+X^3+X^5)$, is used as the data pattern for the UW portion. As in the case of pattern P1, pattern P2 may be represented as symbol data by being split into units of two bits from the most significant bit, as shown in FIG. 22C. Regarding "10" and "01" as wild cards "", FIG. 22C will look like FIG. 22D. In the case of this pattern P2, symbol alternations for a length of eight symbols would emerge due to only one permutation of misdetections: fourth and eighth symbol data being misjudged as "11" and the fifth, seventh, and ninth symbol data being misjudged as "00". Therefore, between pattern P1 and pattern P2, pattern P2 has smaller chances of allowing the alternation detection section 101** to misdetect symbol alternations. Hence, pattern P2 is more suitable as the data pattern for the UW portion than pattern P1.

Thus, it is desirable to use a data pattern for the UW portion such that a predetermined number of consecutive symbol alternations will not emerge even in the case where the alternation detection section 101 misjudges symbol data. However, the actual data pattern used for the UW portion are such that they often allow a predetermined number of consecutive symbol alternations to emerge due to misjudgment of several symbol data. Therefore, if it is known that the alternation detection section 101 may erroneously detect a predetermined number of consecutive symbol alternations with a probability of $N_{err}$ times per frame (where $N_{err}$ is an integer equal to or greater than one), the number-of-correction-values-to-go-back 1311 is selected to be $N_{err}$. This effectively prevents the detected signal 111 from being subjected to a phase correction using unwanted correction values calculated at any portion other than the PR portion. For example, in the case where pattern P2 is used, the alternation detection section 101 may erroneously detect a predetermined number of consecutive symbol alternations with a probability of once per frame; therefore, the number-of-correction-values-to-go-back 1311 should be set to one in this case.

The number-of-correction-values-to-go-back 1311 should be set to as small a value as possible for the following two reasons. The first reason is that, as the number-of-correctionvalues-to-go-back 1311 increases, the effective correction value 118 will be chosen among correction values calculated closer to the beginning of the PR portion, where the characteristics of the detected signal 111 are not very stable. The second reason is that as the number-of-correction-values-to-go-back 1311 increases, the circuitry scale of the correction value storage section 1301 will increase. As already mentioned above, the exact timing with which gain control becomes stable in a receiver might vary depending on the structure of the receiver and/or the state of the communication path, and therefore, in the case of a receiver in which gain control becomes stable at a relatively early point while the preamble is being received, it is acceptable to use correction values which are calculated at any point after gain control has been stabilized. Thus, depending on the structure of the receiver, the number-of-correction-values-to-go-back 1311 does not need to be set to as small a value as possible; it may be set to a greater value instead.

Figure 23:
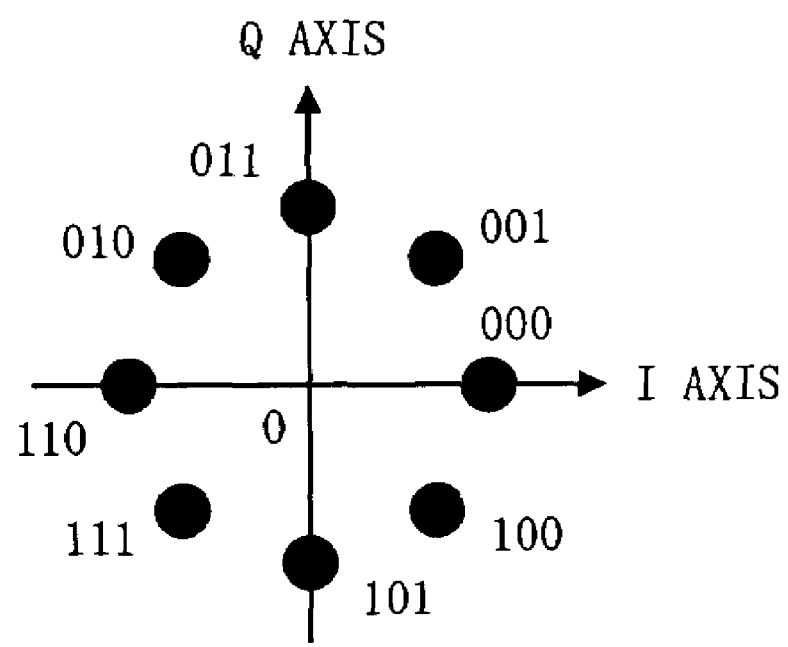
FIG. 23 is a chart illustrating an exemplary constellation pattern in the case where the detected signal is a signal obtained by subjecting an 8-phase PSK modulated signal to delay detection.

In the above description, it is assumed that the detected signal 111 is a signal obtained by subjecting a QPSK modulated signal to delay detection. However, similar considerations can also be made concerning a UW portion data pattern in the case where the detected signal 111 is modulated by a multi-value modulation method of three or more values. For instance, an example will be described where the detected signal 111 is a signal obtained by subjecting an 8-phase PSK modulated signal to delay detection. FIG. 23 is a chart illustrating an exemplary constellation pattern in the case of 8-phase PSK. In the case where eight symbol data are fitted on the IQ coordinate system as shown in FIG. 23, not only "011" and "101" which are on the Q axis, but also "001", "010", "111" and "100" which are within ±45° of the Q axis are considered as wild cards. By employing a similar method to that used in the case of QPSK technique under this assumption, it would be possible to derive a preferable data pattern for the UW portion in the case of 8-phase PSK, such that consecutive symbol alternations spanning a predetermined length will not be detected even in the case where the alternation detection section 101 misdetects several symbols contained in the UW portion. Thus, with respect to a multi-value modulation method of three or more values, too, a similar method to that used in the case of QPSK technique can be applied by regarding signal points which are within a predetermined angle from the Q axis as wild cards, whereby a preferable data pattern for the UW portion can be derived.

Second Embodiment

Figure 24:
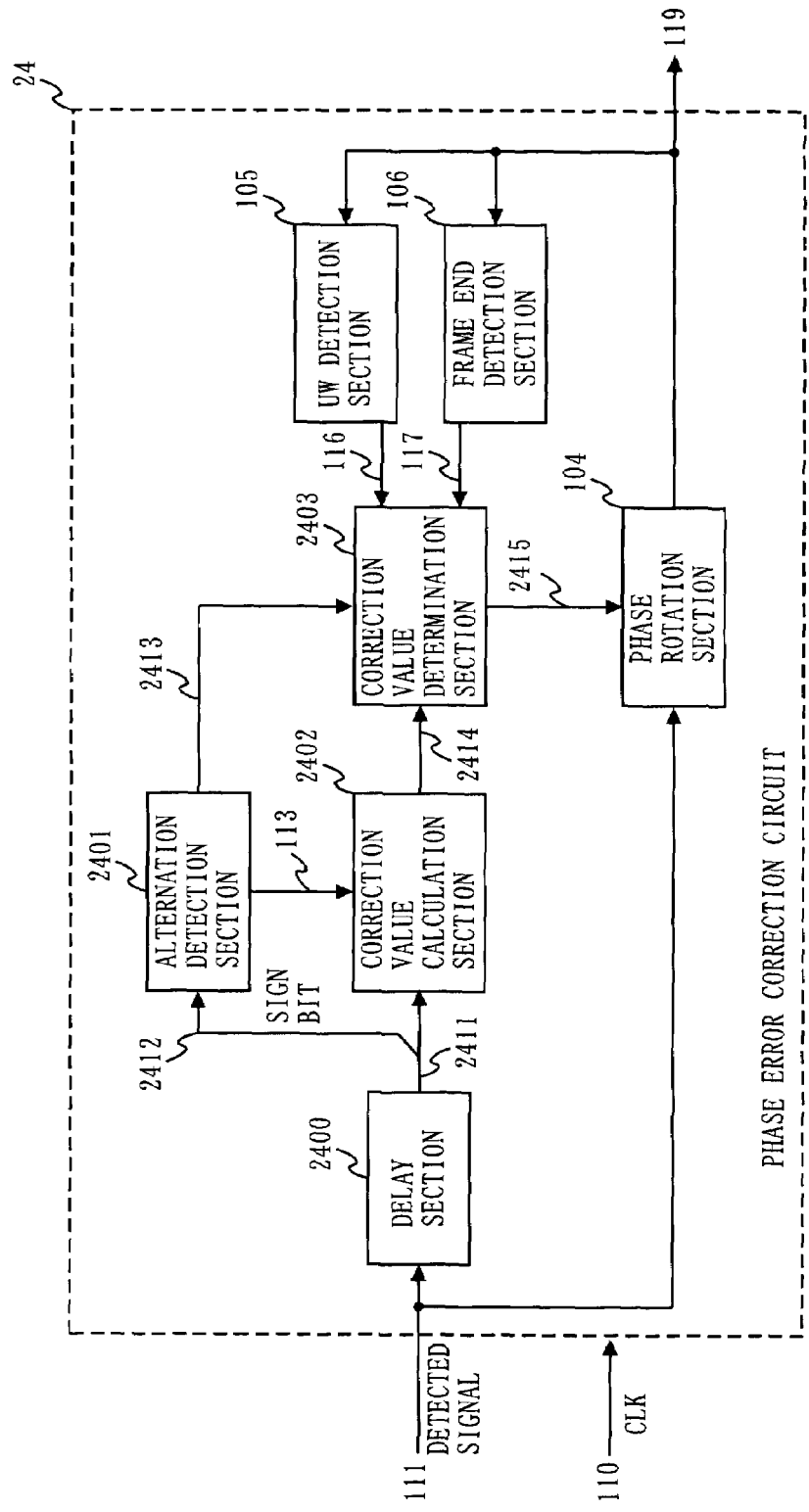
FIG. 24 is a block diagram illustrating the structure of a phase error correction circuit according to a second embodiment of the present invention.

FIG. 24 is a block diagram illustrating the structure of a phase error correction circuit 24 according to a second embodiment of the present invention. The phase error correction circuit 24 shown in FIG. 24 comprises a delay section 2400, an alternation detection section 2401, a correction value calculation section 2402, a correction value determination section 2403, a phase rotation section 104, a UW detection section 105, and a frame end detection section 106. The phase error correction circuit 24 is similar to the phase error correction circuit 1 according to the first embodiment in that the phase error correction circuit 24 is to be used while being incorporated in the receiver 2 shown in FIG. 2, that the frame-structured detected signal 111 as shown in FIG. 3 is input thereto, and that the PR portion of the detected signal 111 includes symbol alternations. Those component elements of the present embodiment which have identical counterparts in the first embodiment are denoted by like numerals, and the descriptions thereof are omitted.

The phase error correction circuit 24 is characterized in that a detected signal which is input to the correction value calculation section 2402 is delayed by a predetermined amount from a detected signal which is input to the phase rotation section 104, so that the UW portion is detected while a correction value is being calculated with respect to the PR portion. This prevents unwanted correction values which are calculated with respect to the UW portion from being used by the phase rotation section 104. The phase error correction circuit 24 is also characterized in that it is unnecessary to store a plurality of correction values and go back a number of correction values to determine a single correction value to be used, unlike in the phase error correction circuit 1 according to the first embodiment,.

Hereinafter, the details of the delay section 2400, the alternation detection section 2401, the correction value calculation section 2402, and the correction value determination section 2403 will be described mainly with respect to the differences from the first embodiment. As shown in FIG. 24, the delay section 2400 is provided in front of the alternation detection section 2401 and the correction value calculation section 2402. The delay section 2400 delays the detected signal 111 by a predetermined amount of time (hereinafter referred to as "DLYA"), and outputs a delayed detected signal 2411. The delayed detected signal 2411 is input to the correction value calculation section 2402, and a sign bit 2412 of the delayed detected signal 2411 is input to the alternation detection section 2401.

As does the alternation detection section 101 in the first embodiment, the alternation detection section 2401 includes a counter for counting symbol alternations, and outputs an alternation detection signal 113 and a correction value calculation signal 2413. However, once the count value reaches (N−1), the alternation detection section 2401 does not update the count value even if any further symbol alternations are detected. Thus, when any more symbol alternations are detected beyond the predetermined value N, the alternation detection section 2401 outputs the correction value calculation signal 2413 for each symbol beyond N.

Figure 25:
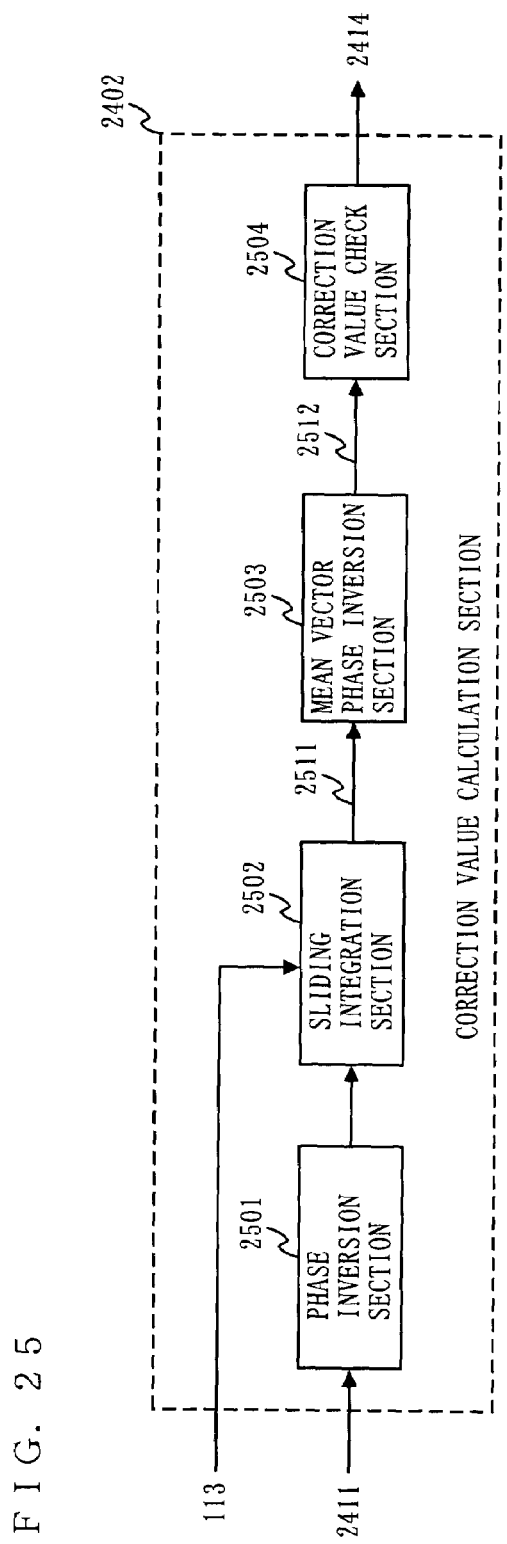
FIG. 25 is a block diagram illustrating the detailed structure of a correction value calculation section included in the phase error correction circuit shown in FIG. 24.

FIG. 25 is a block diagram illustrating the detailed structure of the correction value calculation section 2402. The correction value calculation section 2402 includes a phase inversion section 2501, a sliding integration section 2502, a mean vector phase inversion section 2503, and a correction value check section 2504. The phase inversion section 2501 is identical to that included in the correction value calculation section 102 according to the first embodiment. The mean vector phase inversion section 2503 and the correction value check section 2504 are also identical to that included in the correction value calculation section 102 according to the first embodiment except that the frequency of their processes is different from that of the first embodiment.

While the alternation detection signal 113 is valid, the sliding integration section 2502 derives a first mean vector 2511 by subjecting the output signal from the phase inversion section 2501 to sliding integration. As used herein, sliding integration is a process which, in the case where an incoming signal is sequentially input in a symbol-by-symbol manner, employs a plurality of adders in parallel to derive sums of a predetermined number of consecutive symbols, while shifting the first one of the consecutive symbols by one symbol each time. Herein, the predetermined number M is an integer which is equal to or greater than two and which is equal to or less than the number of symbols contained in the preamble. For example, assuming that the predetermined number M is "10", the sliding integration will sequentially calculate a sum of the first to tenth symbols, a sum of the second to the eleventh symbols, a sum of the third to the twelfth symbols . . . , and soon. By using such a sliding integration section 2502, mean values of the output signal from the phase inversion section 2501 can be obtained at a rate of one per symbol period. In the case where the noise contained in the signal is so low that the signal degradation due to noise is negligible, the aforementioned averaging process by the sliding integration section 2502 can be omitted by setting the predetermined number M to one.

Figure 26:
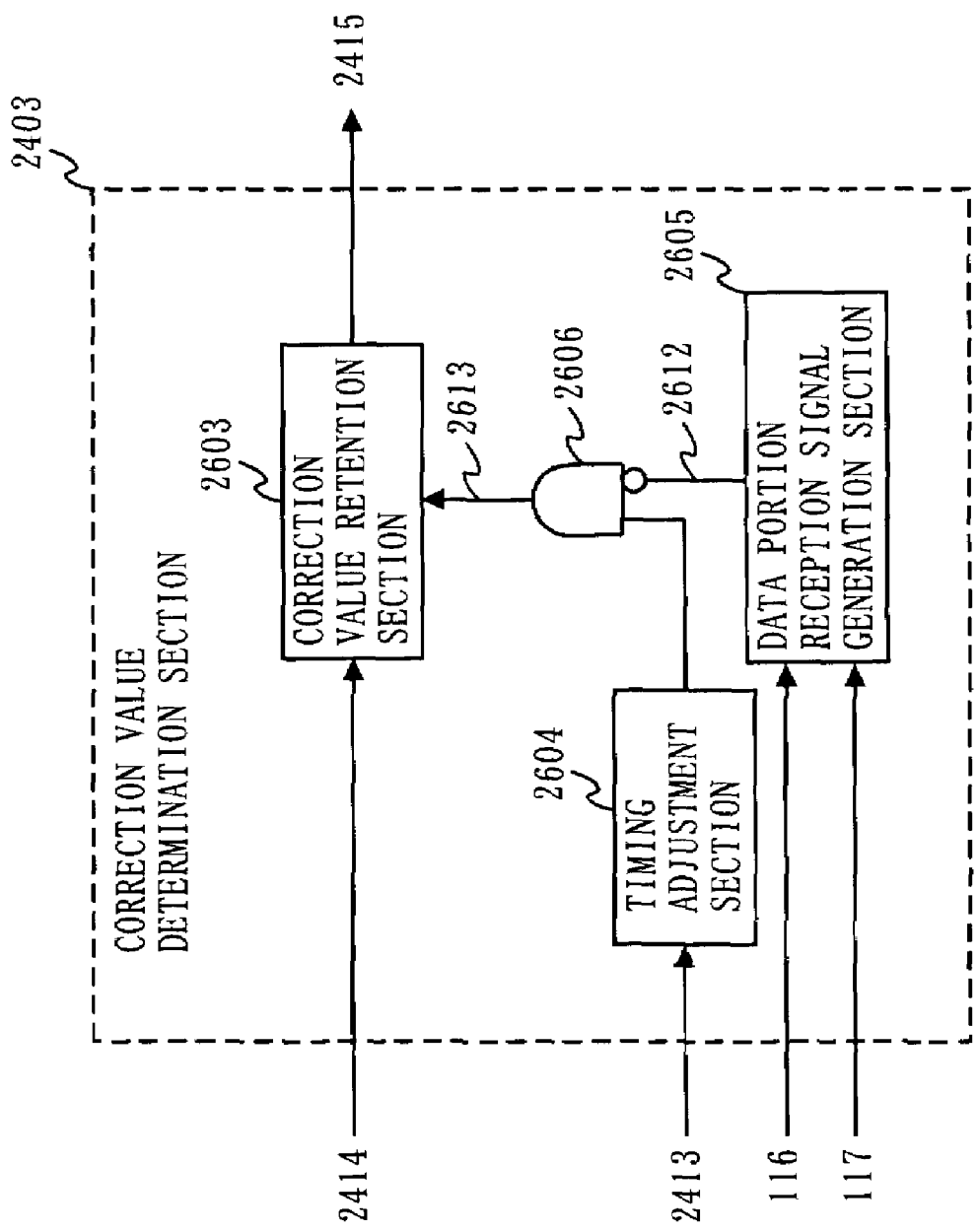
FIG. 26 is a block diagram illustrating the detailed structure of a correction value determination section included in the phase error correction circuit shown in FIG. 24.

FIG. 26 is a block diagram illustrating the detailed structure of the correction value determination section 2403. The correction value determination section 2403 includes a correction value retention section 2603, a timing adjustment section 2604, a data portion reception signal generation section 2605, and a logic gate 2606. The correction value determination section 2403 is identical to the correction value determination section 103 according to the first embodiment except that the correction value storage section 1301 and the correction value selection section 1302 are omitted therefrom. When the update signal 2613 becomes valid, the correction value retention section 2603 fetches a correction value 2414 which is output from the correction value calculation section 2402 and retains it as an effective correction value 2415. Otherwise, the operation and operation timing of the correction value determination section 2403 are the same as those of the correction value determination section 103 according to the first embodiment, and the descriptions thereof are omitted.

Figure 27:
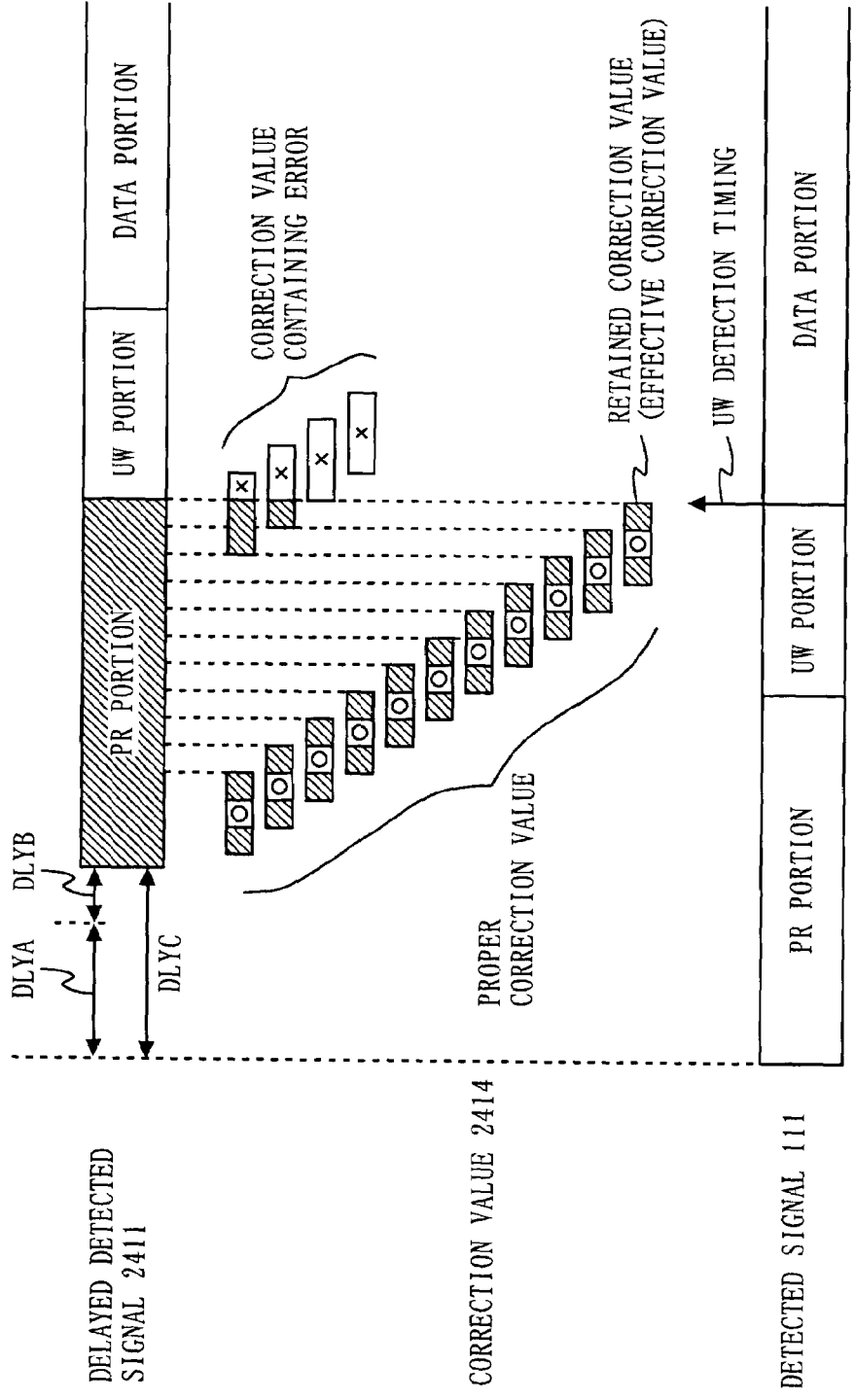
FIG. 27 is a chart illustrating a temporal relationship between the detected signal and an effective correction value in the phase error correction circuit shown in FIG. 24.

Referring to FIG. 27, the operation of the phase error correction circuit 24 will be described. FIG. 27 is a chart illustrating a temporal relationship between the detected signal 111 and the effective correction value 2415 in the phase error correction circuit 24. In the phase error correction circuit 24, due to the action of the delay section 2400, the delayed detected signal 2411 which is input to the correction value calculation section 2402 is delayed, by the time DLYA, from the detected signal 111 which is input to the phase rotation section 104. It is assumed that, in the correction value calculation section 2402 and the correction value determination section 2403, a processing time DLYB is required in order to calculate the correction value 2414 and determine the effective correction value 2415. Thus, there is a time difference, equal to a sum of DLYA and DLYB (hereinafter referred to as "DLYC"), between the detected signal 111 which is input to the phase rotation section 104 and the effective correction value 2415.

Therefore, as the delay time DLYA to be used in the delay section 2400, a value is selected such that the UW detection section 105 will output the UW detection signal 116 while the correction value calculation section 2402 is calculating a correction value with respect to the PR portion. More preferably, a value is selected for the delay time DLYA such that the UW detection section 105 will output the UW detection signal 116 while the correction value calculation section 2402 is calculating a correction value with respect to the end of the PR portion. Even more preferably, a value is selected for the delay time DLYA such that the UW detection section 105 will output the UW detection signal 116 when the correction value calculation section 2402 has completed the calculation of a correction value with respect to the end of the PR portion.

As does the correction value determination section 103 according to the first embodiment, the correction value determination section 2403 updates the effective correction value 2415 when the UW detection section 105 has output the UW detection signal 116. Therefore, by selecting the value of the delay time DLYA in the aforementioned manner, the correction value determination section 2403 fetches and retains, as the effective correction value 2415, a correction value which is calculated with respect to the PR portion, a correction value which is calculated with respect to a later part of the PR portion, or a correction value which is calculated with respect to the end of the PR portion. As a result, irrespective of the data pattern of the UW portion, the phase error in the detected signal 111 can be properly corrected by using a correction value which is calculated with only respect to the PR portion.

Although the phase error correction circuit 24 was illustrated as including the delay section 2400 in front of the alternation detection section 2401 and the correction value calculation section 2402, it will be appreciated that the delay section 2400 may be provided at any other place in the block diagram of FIG. 24 so long as a predetermined time difference can be obtained between the detected signal 111 which is input to the phase rotation section 104 and the effective correction value 2415. For example, the delay section 2400 may be provided between the correction value determination section 2403 and the phase rotation section 104.

The phase error correction circuit 24 differs from the phase error correction circuit 1 according to the first embodiment in that the correction value calculation section 2402 performs sliding integration, whereas the correction value calculation section 102 according to the first embodiment performs cumulative additions. When the alternation detection section 2401 detects any more symbol alternations beyond the predetermined value N, the correction value calculation section 2402 outputs a correction value 2414 for each symbol beyond N. Therefore, by suitably setting the delay time DLYA, a correction value which is calculated at a symbol alternation immediately before the UW portion is retained as the effective correction value 2415, at the time when the UW detection signal 116 is output. A phase rotation process can be performed by using the effective correction value 2415.

As already mentioned above, the exact timing with which gain control becomes stable in a receiver might vary depending on the structure of the receiver and/or the state of the communication path, and therefore, in the case of a receiver in which gain control becomes stable at a relatively early point while the preamble is being received, it is acceptable to use correction values which are calculated at any point after gain control has been stabilized. Thus, depending on the structure of the receiver, the delay time DLYA does not need to be set to a value such that a correction value which is calculated at a symbol alternation immediately before the UW portion is retained as the effective correction value 2415; it may be set to a greater value instead.

As described above, in accordance with the phase error correction circuit of the present embodiment, when the UW portion is detected, a correction value calculated with respect to the PR portion is always retained, so that, by performing a phase correction for the detected signal by using the retained phase correction value, a highly accurate phase correction can be performed. By suitably constructing the correction value determination section, it becomes possible to perform a phase correction for the input signal by using a phase correction value which is calculated with respect to a later part or the end of the PR portion, where the characteristics of the detected signal have already become stable. Thus, the accuracy of the phase correction can be further enhanced.

As in the first embodiment, the present embodiment also permits a first variant where the frame end detection section 106 is omitted, and a second variant where a 45° rotation section 1900 is added in front of or after the delay section 2400.

Third Embodiment

Figure 28:
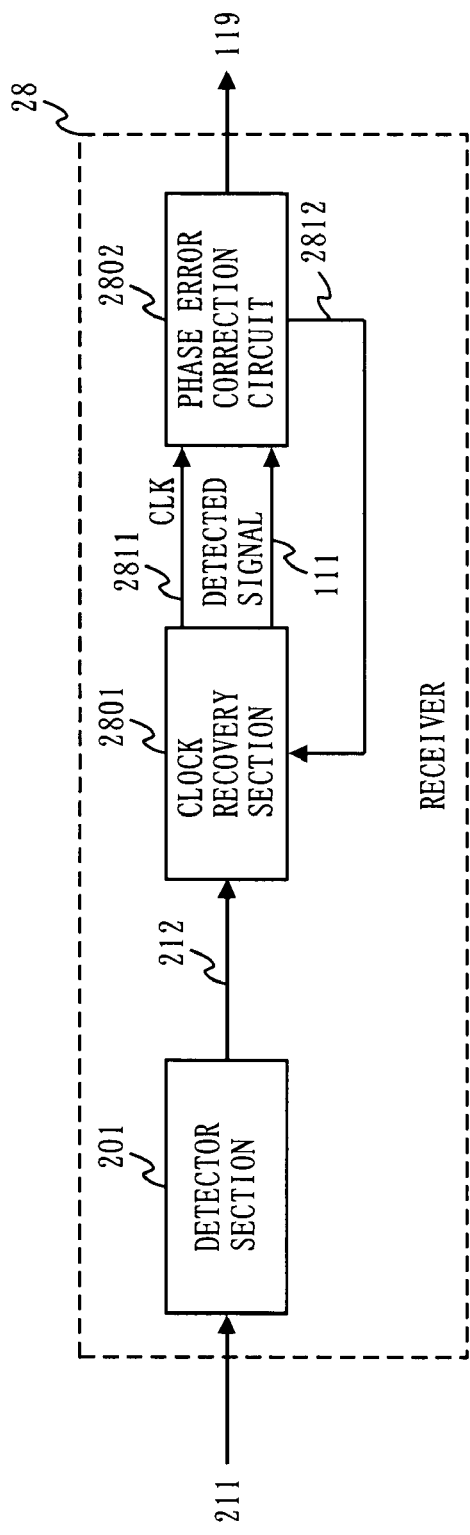
FIG. 28 is a block diagram illustrating the structure of a receiver according to a third embodiment of the present invention.

FIG. 28 is a block diagram illustrating the structure of a receiver 28 according to a third embodiment of the present invention. The receiver 28 shown in FIG. 28 comprises a detector section 201, a clock recovery section 2801, and a phase error correction circuit 2802. The receiver 28 is characterized in that the phase error correction circuit 2802 supplies phase error information indicating the magnitude of a phase error to the clock recovery section 2801, which is provided in front of the phase error correction circuit 2802, and that the clock recovery section 2801 recovers the symbol clock based on the supplied phase error information.

Generally speaking, if a signal received by a receiver has a large phase shift, the recovered symbol clock is unstable, which may degrade the demodulation characteristics. In order to prevent such degradation of the demodulation characteristics, the symbol clock should be recovered while switching axes against which to determine a zero cross (hereinafter referred to as "zero cross reference axes"), based on the phase error information obtained by the phase error correction circuit. As a result of this, the frequency compensation range can be expanded. Hereinafter, the receiver 28, which is constructed based on the above principle, will be specifically described.

In FIG. 28, the detector section 201 is the same as that incorporated in the receiver 2 described in the first embodiment. Based on a detection output 212, the clock recovery section 2801 outputs a detected signal 111 and a symbol clock 2811. At this time, based on effective phase error information 2812 provided by the phase error correction circuit 2802, the clock recovery section 2801 recovers the symbol clock 2811 while switching the zero cross reference axes. The detected signal 111 and the symbol clock 2811 which are output from the clock recovery section 2801 are input to the phase error correction circuit 2802. The phase error correction circuit 2802 uses the symbol clock 2811 to correct the phase shift in the detected signal 111, and outputs a corrected detected signal 119. At this time, the phase error correction circuit 2802 outputs the effective phase error information 2812 indicating the magnitude of the phase error to the clock recovery section 2801.

Figure 29:
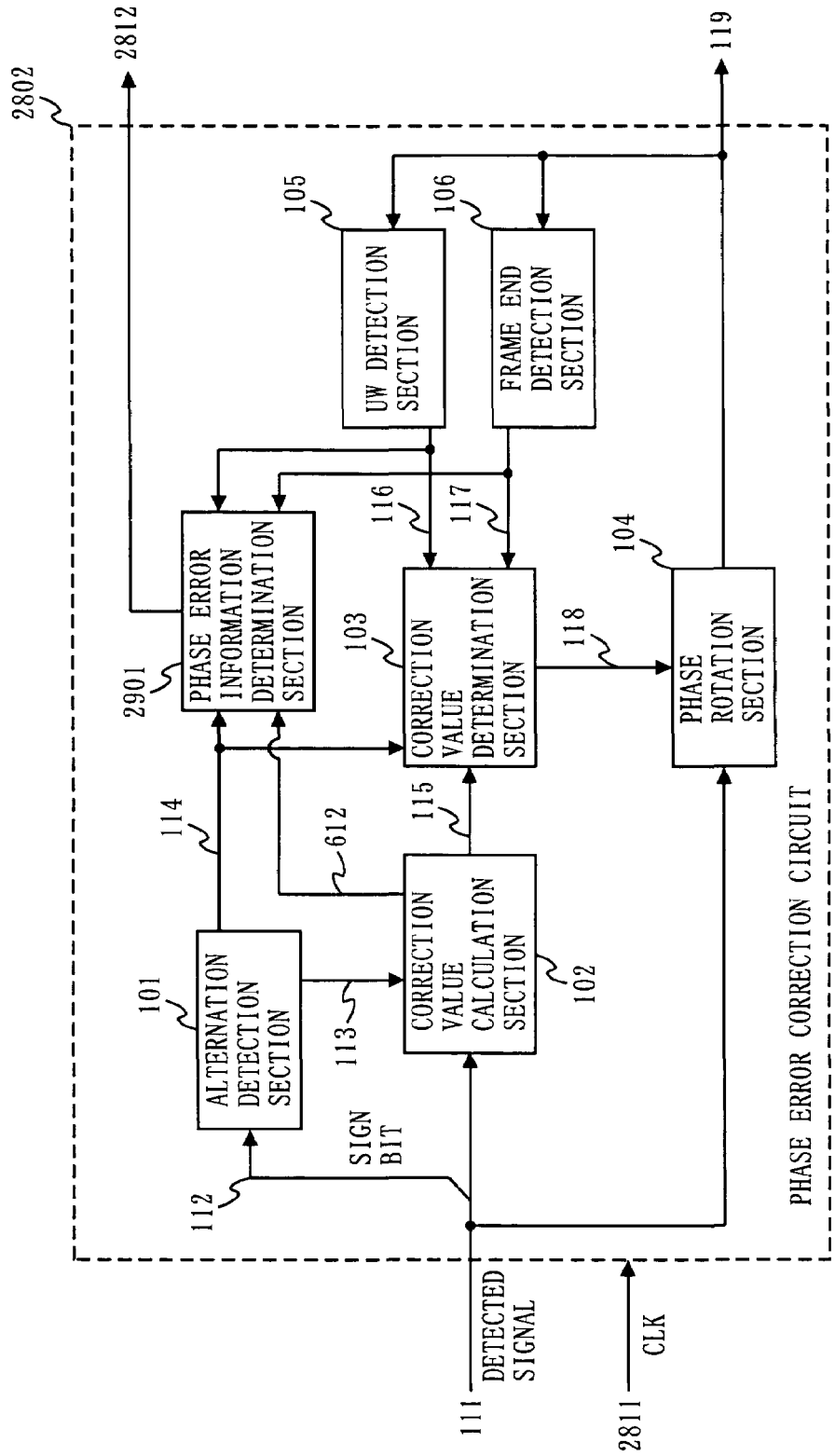
FIG. 29 is a block diagram illustrating the detailed structure of a phase error correction circuit incorporated in the receiver shown in FIG. 28.

FIG. 29 is a block diagram illustrating the detailed structure of the phase error correction circuit 2802. The phase error correction circuit 2802 is identical to the phase error correction circuit 1 according to the first embodiment, with a phase error information determination section 2901 being added thereto. The phase error information determination section 2901 stores, as phase error information, second mean vectors 612 which are output from the correction value calculation section 102 in a chronological order, and outputs the effective phase error information 2812 at a point in time which is determined depending on the UW detection signal 116 and the frame end detection signal 117. The operations of the component elements other than the phase error information determination section 2901 are the same as those in the first embodiment, and the descriptions thereof are omitted. It will be appreciated that a phase error correction circuit having similar functions can also be constructed by adding the phase error information determination section 2901 to the phase error correction circuit 24 according to the second embodiment.

Figure 30:
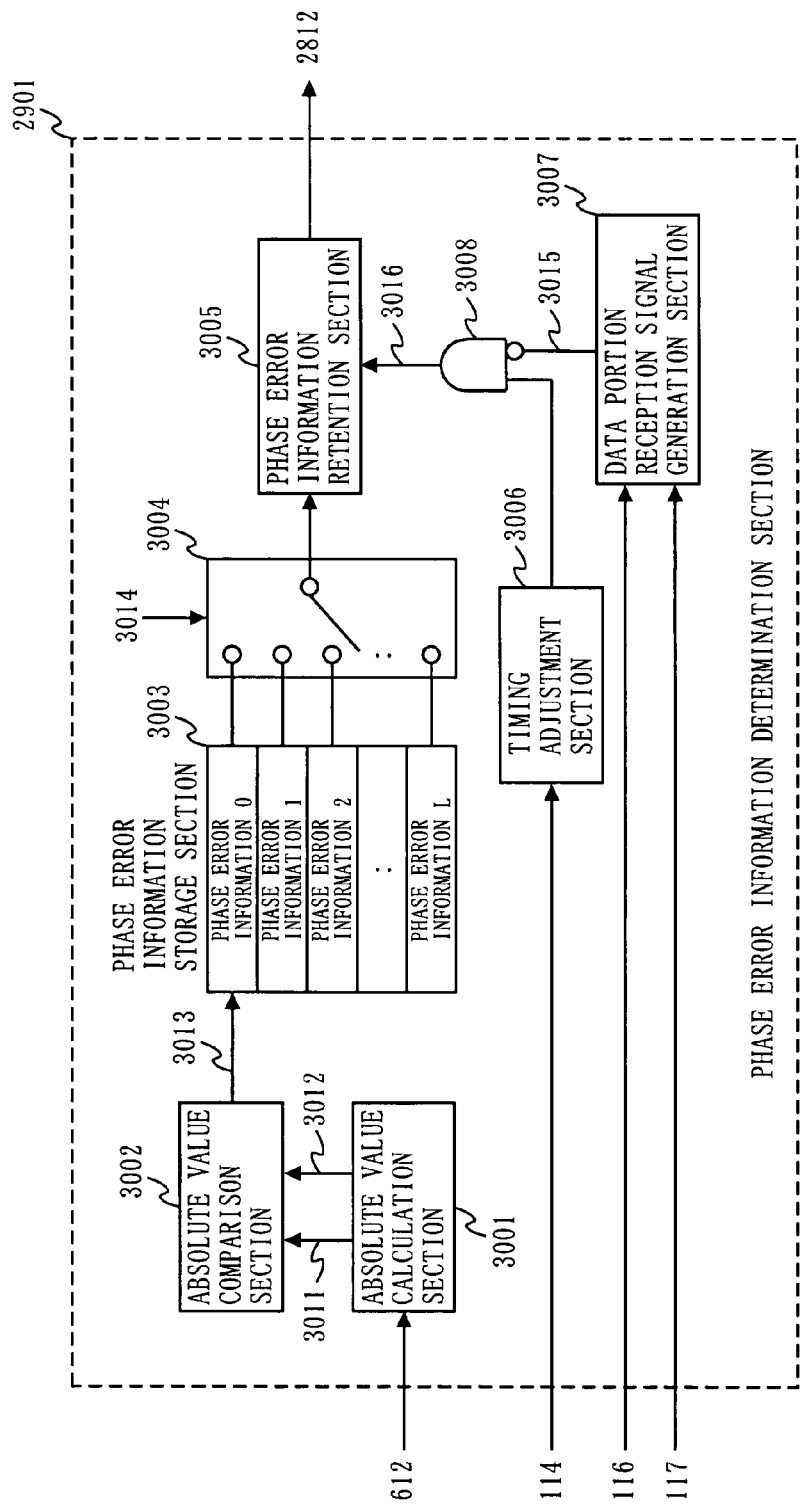
FIG. 30 is a block diagram illustrating the detailed structure of a phase error information determination section included in the receiver shown in FIG. 28.

FIG. 30 is a block diagram illustrating the detailed structure of the phase error information determination section 2901. The phase error information determination section 2901 comprises an absolute value calculation section 3001, an absolute value comparison section 3002, a phase error information storage section 3003, a phase error information selection section 3004, a phase error information retention section 3005, a timing adjustment section 3006, a data portion reception signal generation section 3007, and a logic gate 3008. The absolute value calculation section 3001 calculates an absolute value 3011 of an I axis component and an absolute value 3012 of a Q axis component of the second mean vector 612. Based on the ratio between the absolute values 3011 and 3012, the absolute value comparison section 3002 determines whether the phase angle of the second mean vector 612 is in the vicinity of 45°, and outputs a 45° determination signal 3013 indicating the result of this determination.

The phase error information storage section 3003 regards the 45° determination signal 3013 from the absolute value comparison section 3002 as phase error information, and stores the most recent (L+1) pieces of phase error information in a chronological order. From among the (L+1) pieces of phase error information stored in the phase error information storage section 3003, the phase error information selection section 3004 selects and outputs a piece of phase error information arrived at by going back in time as designated by the number-of-correction-values-to-go-back 3014. The timing adjustment section 3006, the data portion reception signal generation section 3007, and the logic gate 3008 operate in the same manners as their counterparts in the correction value determination section 103 according to the first embodiment. When an update signal 3016 is input, the phase error information retention section 3005 fetches and retains the piece of phase error information which has been selected by the phase error information selection section 3004. The phase error information retained by the phase error information retention section 3005 is supplied to the clock recovery section 2801 as the effective phase error information 2812. The behavior of the input/output signals and internal signals of the phase error information determination section 2901 is the same as that shown in FIG. 14.

Figure 31:
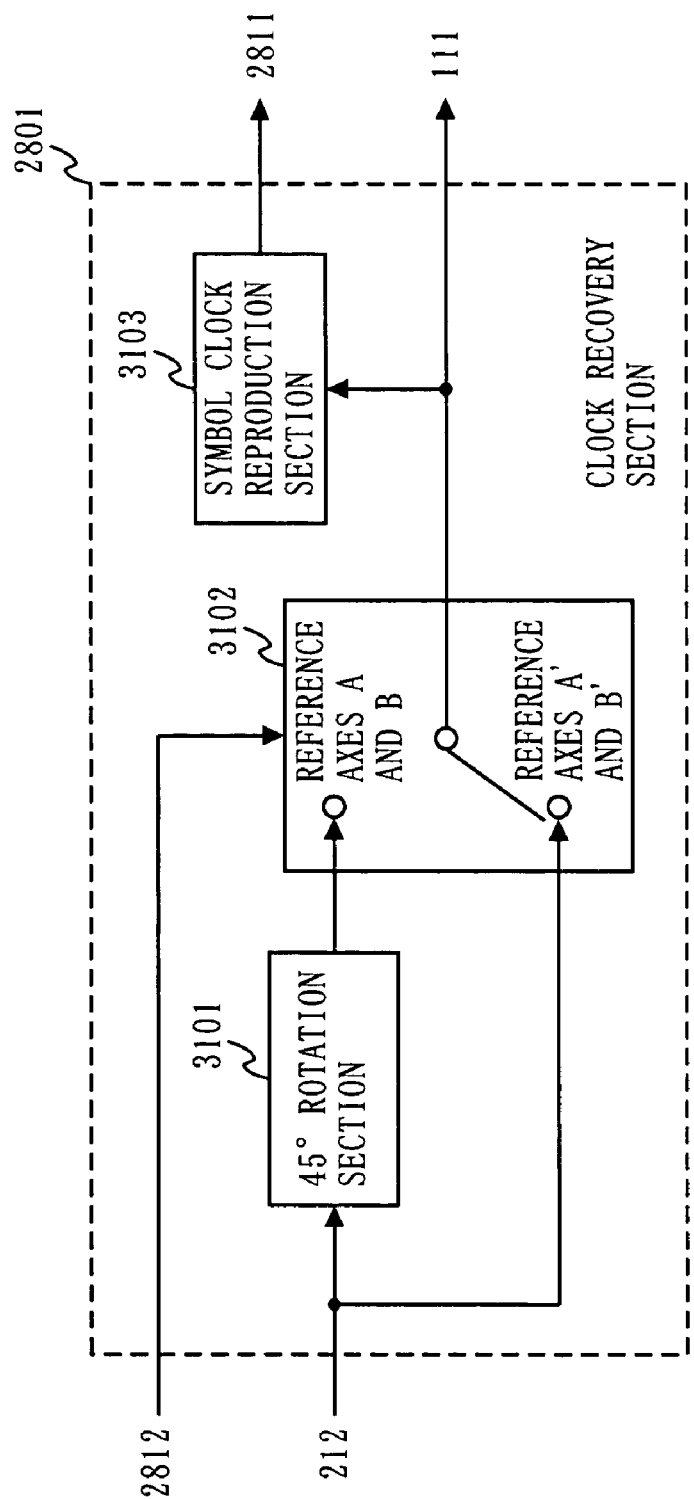
FIG. 31 is a block diagram illustrating the detailed structure of a clock recovery section incorporated in the receiver shown in FIG. 28.

FIG. 31 is a block diagram illustrating the detailed structure of the clock recovery section 2801. The clock recovery section 2801 includes a 45° rotation section 3101, a reference axis selection section 3102, and a symbol clock reproduction section 3103. The 45° rotation section 3101 rotates the phase of the detection output 212 by 45°. Based on the effective phase error information 2812 supplied from the phase error information determination section 2901, the reference axis selection section 3102 selectively outputs either the detection output 212 or the detection output which is output from the 45° rotation section 3101. Based on the detection output selected by the reference axis selection section 3102, the symbol clock reproduction section 3103 recovers the clock signal. The recovered clock signal is output to the phase error correction circuit 2802 as the symbol clock 2811.

Figure 32:
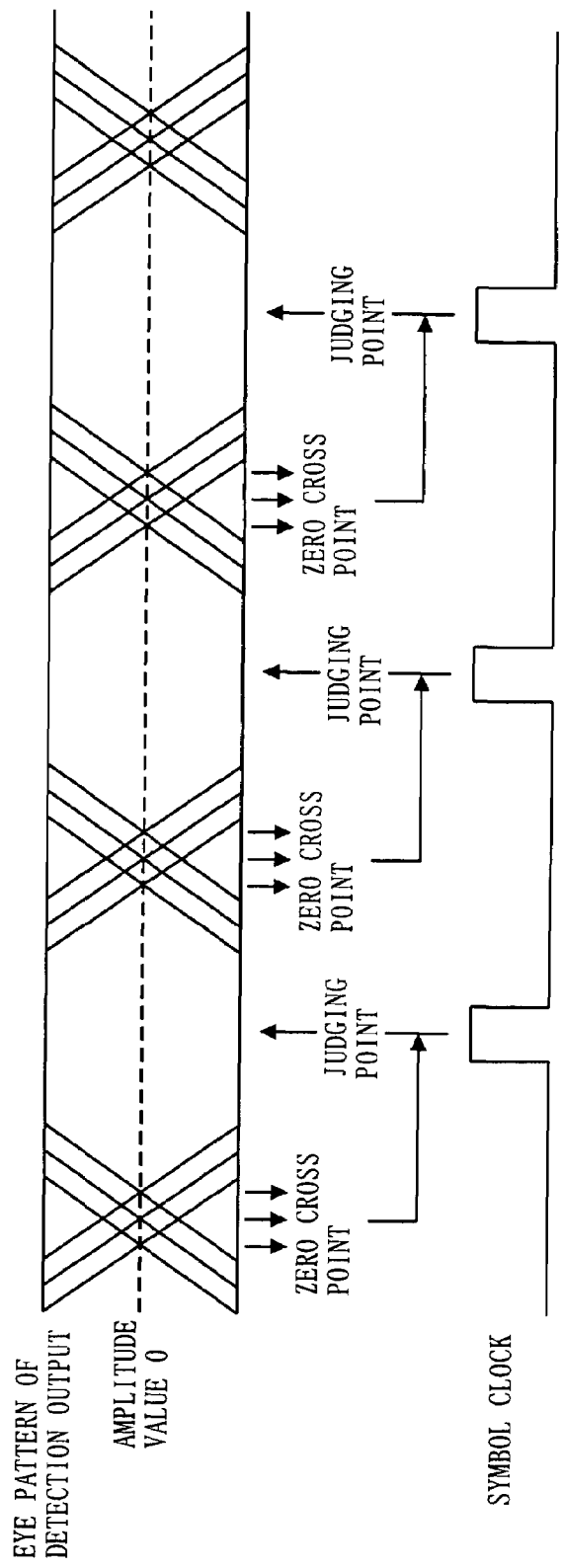
FIG. 32 is a chart illustrating a commonly-used method of recovering a symbol clock.

The operation of the clock recovery section 2801 will be described. FIG. 32 is a chart illustrating a commonly-used method of recovering a symbol clock. In general, the clock recovery section detects zero cross points of an eye pattern, determines judging points based on the detected zero cross points, and generates one clock pulse (or one rising or falling edge) at each judging point. In the case where a data pattern whose phase is inverted 180° between adjacent symbols is used for the PR portion, one of the I axis component and the Q axis component of the detection output 212 always experiences, for each symbol, a zero cross on the constellation pattern irrespective of the amount of phase shift. However, while the UW portion or the data portion is being received, no zero cross may occur depending on the combination of the phase shift amount and the data pattern. Therefore, while the UW portion or the data portion is being received, it is necessary to detect zero crosses while switching the zero cross reference axes depending on the phase shift amount.

Figure 33:
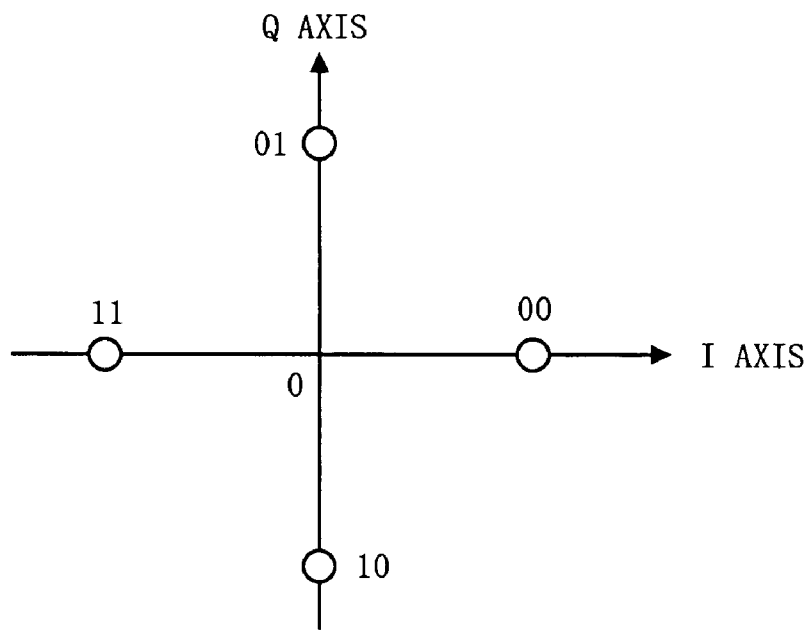
FIG. 33 is a chart illustrating a constellation pattern of a detected signal in the receiver shown in FIG. 28, in the case where there is no phase shift.
Figure 34:
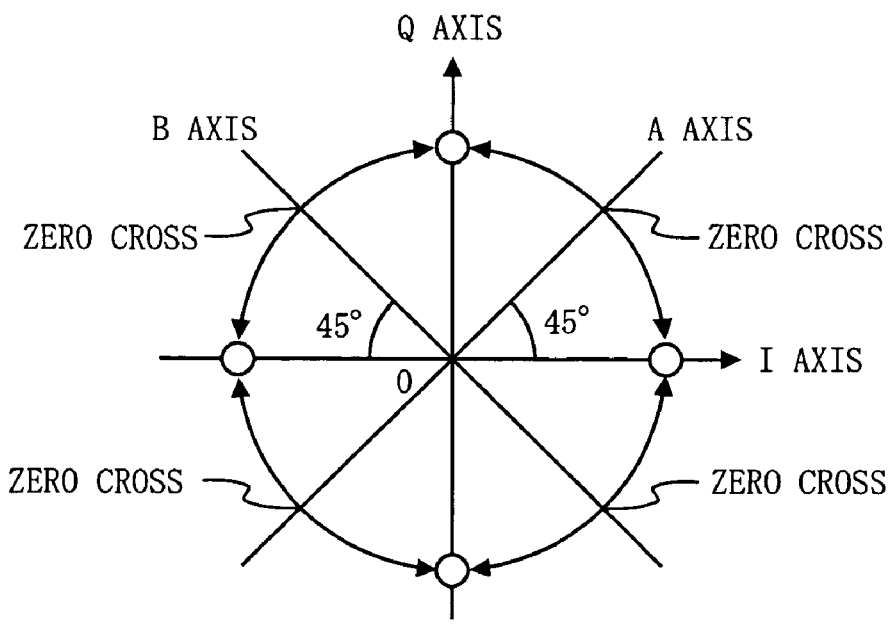
FIG. 34 is a chart illustrating zero cross reference axes in the receiver shown in FIG. 28, in the case where there is no phase shift.

FIG. 33 is a chart illustrating a constellation pattern of the detected signal 111 in the case where there is no phase shift. In the absence of fluctuations due to noise or the like, the symbols of the detected signal 111 will always be located on the I axis or the Q axis as shown in FIG. 33. Hence, as shown in FIG. 34, by performing a zero cross determination using coordinate axes obtained by rotating the I axis and the Q axis by 45° (hereinafter referred to as an "A axis" and a "B axis", respectively), it can be ensured that a zero cross will always be detected for each symbol.

Figure 35:
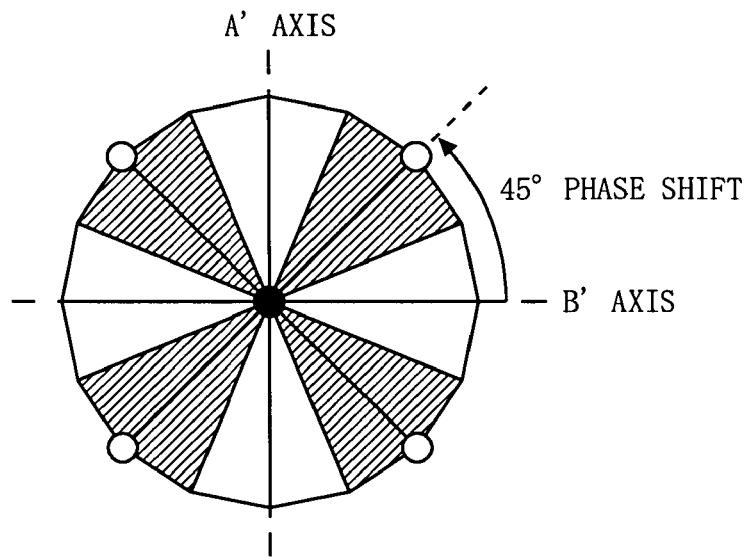
FIG. 35 is a chart illustrating a constellation pattern of a detection output and zero cross reference axes in the receiver shown in FIG. 28, in the case where there is a 45° phase shift.

However, in the case where a phase shift occurs in the detected signal 111, a zero cross detection using the A and B axes may not be able to discover any zero crosses depending on the data. If zero crosses cannot be detected, the tracking of the generated symbol clock is deteriorated, possibly leading to a demodulation error. If the phase shift is 45°, for example, by performing a zero cross determination using coordinate axes obtained by further rotating the A and B axes by another 45° (hereinafter referred to as an "A' axis" and a "B' axis", respectively), it can be ensured that a zero cross will always be detected for each symbol. FIG. 35 is a chart illustrating a constellation pattern of the detection output and zero cross reference axes in the case where there is a 45° phase shift in the detected signal 111.

Therefore, zero crosses can be stably detected in all cases by selecting as zero cross reference axes the A and B axes in the case where the phase shift is close to 0° and selecting the A' and B' axes in the case where the phase shift is close to 45°, and performing a zero cross determination using the selected zero cross reference axes.

In the receiver 28, the correction value determination section 103 determines which range the calculated correction value is in, based on the ratio in length between the I axis component and the Q axis component of the correction value. Therefore, by supplying the result of the determination by the correction value determination section 103 to the clock recovery section 2801, the symbol clock 2811 to be recovered by the clock recovery section 2801 can be stabilized.

Figure 36:
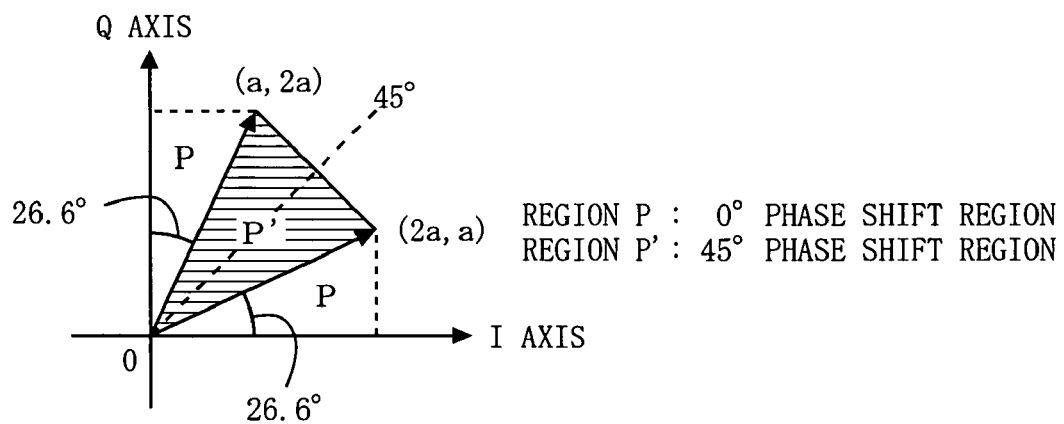
FIG. 36 is a detailed chart illustrating a 0° phase shift region and a 45° phase shift region in the receiver shown in FIG. 28.
Figure 37:
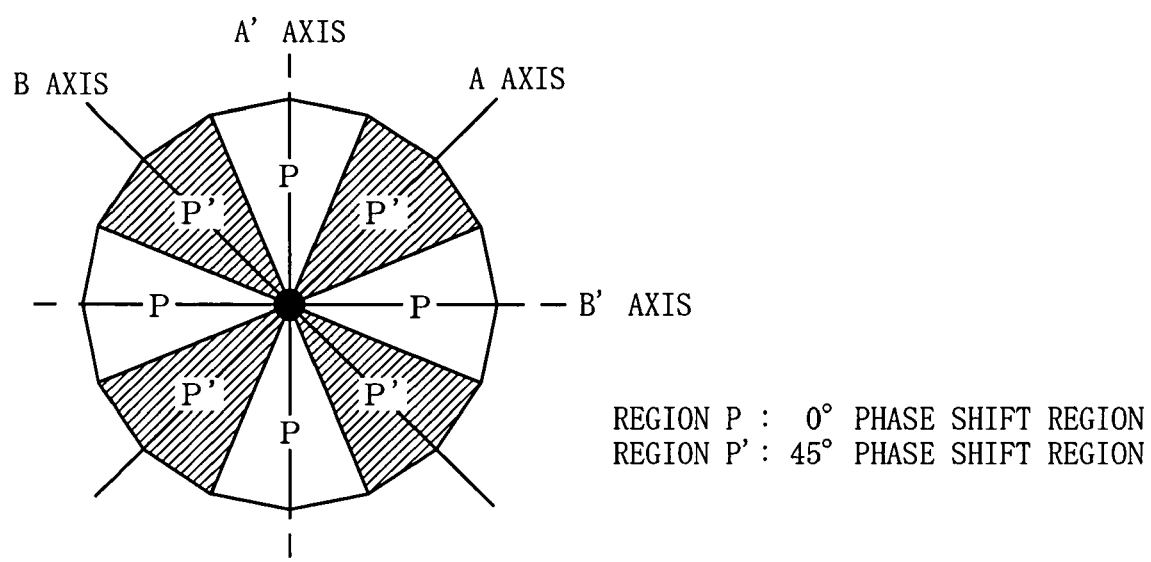
FIG. 37 is a chart illustrating the entire expanse of the 0° phase shift regions and the 45° phase shift regions in the receiver shown in FIG. 28.

As shown in FIGS. 36 and 37, a 0° phase shift region P and a 45° phase shift region P' are set in the IQ coordinate system. FIGS. 36 and 37 show the two regions in detail (FIG. 36) and in their entirety (FIG. 37). Then angle shown in FIG. 36 is derived from $\tan^{-1}(1/2)=26.6°$. The 0° phase shift region P is a region in which the phase shift is determined to be close to 0°. For symbols contained in the 0° phase shift region P, a zero cross determination using the A and B axes may be performed. On the other hand, the 45° phase shift region P' is a region in which the phase shift is determined to be close to 45°. For symbols contained in the 45° phase shift region, a zero cross determination using the A' and B' axes may be performed.

Whether a given symbol is contained in the 0° phase shift region or the 45° phase shift region can be determined in the following manner. Assuming that the absolute values of the I axis component and the Q axis component of a correction value are X and Y, respectively, if X and Y satisfy eq. 4 below, the symbol can be determined as being approximately contained in the 0° phase shift region P. On the other hand, if X and Y satisfy eq. 5 below, the symbol can be determined as being approximately contained in the 45° phase shift region P'.

$$X-2Y>0 \text{ or } 2X-Y<0 \qquad \text{eq. 4}$$

$$X-2Y<0 \text{ and } 2X-Y>0 \qquad \text{eq. 5}$$

The absolute value comparison section 3002 determines whether the two absolute values 3011 and 3012 which have been output from the absolute value calculation section 3001 satisfy eq. 4 or eq. 5. If eq. 4 is satisfied, the absolute value comparison section 3002 sets the value of the 45° determination signal 3013 to "0", for example, and if eq. 5 is satisfied, sets the value of the 45° determination signal 3013 to "1", for example. The 45° determination signal 3013 is led through the phase error information storage section 3003, the phase error information selection section 3004, and the phase error information retention section 3005, until it is finally input to the reference axis selection section 3102 as the effective phase error information 2812. If the value of the effective phase error information 2812 is "0", the reference axis selection section 3102 selects the A and B axes as the zero cross reference axes. If the value of the effective phase error information 2812 is "1", the reference axis selection section 3102 selects the A' and B' axes as the zero cross reference axes. Thus, based on the effective phase error information 2812 from the phase error correction circuit 2802, the clock recovery section 2801 recovers the symbol clock while switching the zero cross reference axes.

The absolute value comparison section 3002 may calculate the phase angle of the second mean vector 612, and determine the 45° determination signal 3013 based on the calculated phase angle. The absolute value comparison section 3002 may determine the 45° determination signal 3013 based on the ratio in length between the I axis component and the Q axis component of the second mean vector. In particular, the multiplications by the factor of two which are included in eq. 4 and eq. 5 can be realized through a bit shift process; therefore, the calculations expressed by eq. 4 and eq. 5 can be easily made through bit shift processes and addition processes, without having to calculate the phase angle.

As described above, in accordance with the receiver of the present embodiment, phase error information indicating the magnitude of a phase error is supplied from the phase error correction circuit to the clock recovery section, and the clock recovery section recovers the symbol clock based on the phase error information. As a result, a stable symbol clock can be obtained even in the presence of a large phase shift, whereby the demodulation characteristics are improved.

Fourth Embodiment

Figure 38:
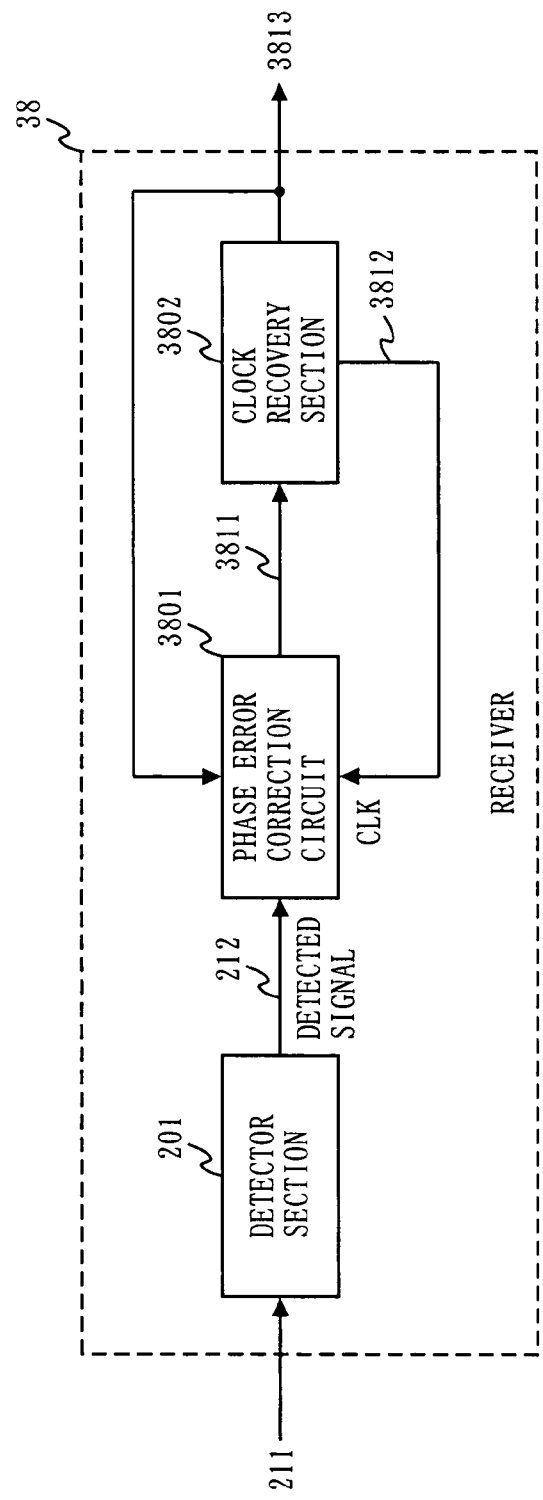
FIG. 38 is a block diagram illustrating the structure of a receiver according to a fourth embodiment of the present invention.

FIG. 38 is a block diagram illustrating the structure of a receiver 38 according to a fourth embodiment of the present invention. The receiver 38 shown in FIG. 38 comprises a detector section 201, a phase error correction circuit 3801, and a clock recovery section 3802. The detector section 201, the phase error correction circuit 3801, and the clock recovery section 3802 shown in FIG. 38 correspond to the detector section 201, the phase error correction circuit 1, and the clock recovery section 202 shown in FIG. 2, respectively. The receiver 38 is characterized in that the phase error correction circuit 3801, which is provided in front of the clock recovery section 3802, performs a sample-by-sample phase correction for a detection output 212 which is output from the detector section 201.

Figure 39:
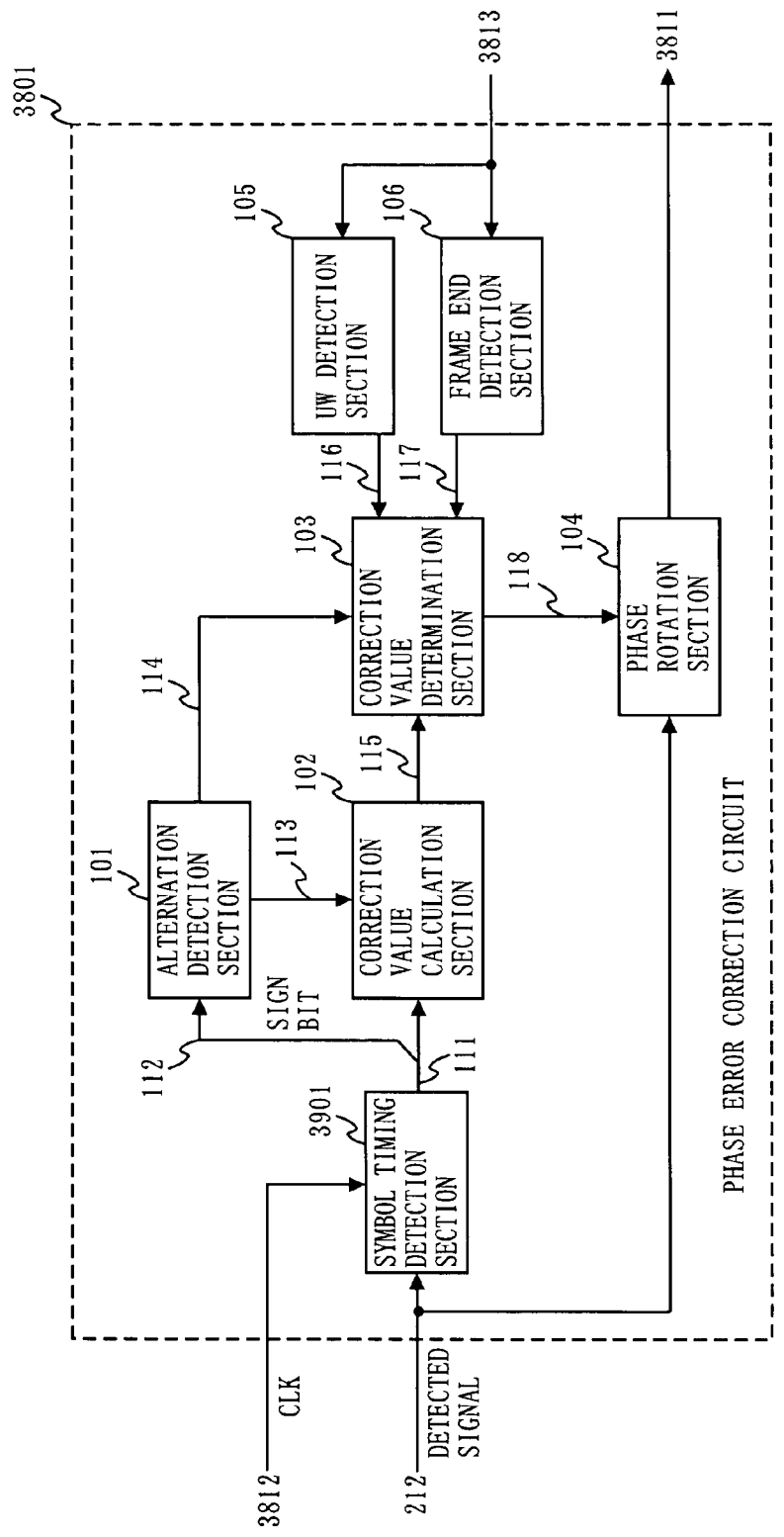
FIG. 39 is a block diagram illustrating the structure of a phase error correction circuit incorporated in the receiver shown in FIG. 38.
Figure 40:
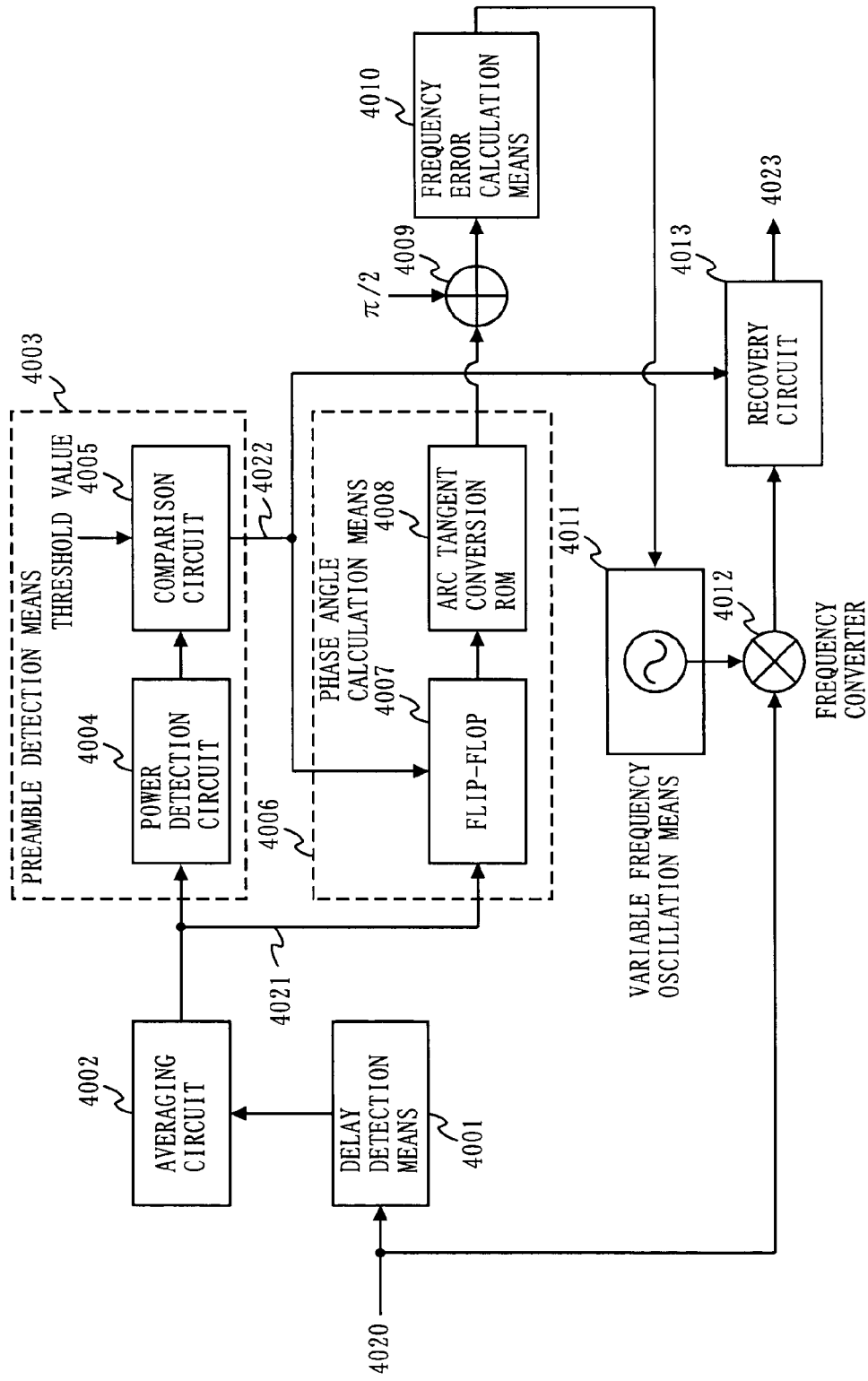
FIG. 40 is a block diagram illustrating the structure of a conventional demodulator.

The phase error correction circuit 3801 subjects the detection output 212 to a judging point determination based on a symbol clock 3812 recovered by the clock recovery section 3802, calculates a correction value for the detection output which has been subjected to the judging point determination, and corrects the phase shift in the detection output 212 in a sample-by-sample manner by using the calculated correction value. FIG. 39 is a block diagram illustrating the structure of the phase error correction circuit 3801. The phase error correction circuit 3801 is identical to the phase error correction circuit 1 according to first embodiment, with a symbol timing detection section 3901 added thereto. Hereinafter, differences between the phase error correction circuit 3801 and the phase error correction circuit 1 according to the first embodiment will be described.

A detection output 212 from the detector section 201 and a symbol clock 3812 recovered by the clock recovery section 3802 are input to the symbol timing detection section 3901. As has been described with reference to FIG. 32, the symbol timing detection section 3901 recognizes openings in the eye pattern on basis of the symbol clock 3812, and outputs a detected signal 111. To the UW detection section 105 and the frame end detection section 106, a corrected detected signal 3813 for which judging points have been determined by the clock recovery section 3802 is input. The UW detection section 105 outputs a UW detection signal 116 upon detecting a UW portion being contained in the corrected detected signal 3813. The frame end detection section 106 outputs a frame end detection signal 117 upon detecting a frame end portion being contained in the corrected detected signal 3813. The alternation detection section 101, the correction value calculation section 102, and the correction value determination section 103 operate in similar manners to their counterparts in the phase error correction circuit 1 according to the first embodiment. Thus, in a manner similar to the first embodiment, an effective correction value 118 is calculated based on the detected signal 111. The phase rotation section 104 performs a phase rotation process for each sample of the detection output 212, by using the effective correction value 118 which is output from the correction value determination section 103. The output signal from the phase rotation section 104 is supplied to the clock recovery section 3802 as a corrected detection output 3811.

In the above-described first to third embodiments, the detected signal 111 is input to the phase error correction circuit, so that the phase rotation section 104 performs a phase rotation process as expressed by eq. 1 and eq. 2 with the cycle of the symbol clock. According to the present embodiment, however, the detection output 212 is input to the phase error correction circuit 3801; therefore, the phase rotation section 104 needs to perform a phase rotation process for each sample. On the other hand, according to the present embodiment, a signal whose phase shift has already been corrected is input to the clock recovery section 3802, so that the clock recovery section 3802 does not need to switch the zero cross reference axes based on effective phase error information, unlike in the third embodiment.

The above-described receiver 38 is illustrated as comprising a phase error correction circuit 3801, which is based on the phase error correction circuit 1 of the first embodiment with the symbol timing detection section 3901 added thereto. Alternatively, the receiver 38 may comprise a phase error correction circuit which is based on the phase error correction circuit 24 according to the second embodiment (which includes the delay section 2400) with the symbol timing detection section 3901 added thereto. Similar effects to those obtained in the case of using the phase error correction circuit 1 not containing any delay section can be obtained in the case where the phase error correction circuit 24 including the delay section 2400 is used.

The phase error correction circuit and the receiver according to the present invention performs a highly accurate phase correction, and therefore can be used, for example, in various types of wired or wireless communication systems which transmits or receives data which is split in frames.

While the invention has been described in detail, the foregoing description is in all aspects illustrative and not restrictive. It is understood that numerous other modifications and variations can be devised without departing from the scope of the invention.

What is claimed is:

1. A phase error correction circuit for correcting a phase error in an input signal having a frame structure containing a preamble, a unique word, and data, said phase error correction circuit comprising:
    a correction value calculation section for calculating a phase correction value based on a predetermined number of symbols contained in the preamble the input signal;
    a correction value determination section for retaining, with a timing at which a specific pattern contained in the unique word is detected, a phase correction value calculated by the correction value calculation section;
    a phase rotation section for subjecting the input signal to a phase rotation process using the phase correction value retained in the correction value determination section; and
    a specific pattern detection section for detecting the specific pattern contained in an output signal from the phase rotation section, and outputting a result of the detection to the correction value determination section.

2. The phase error correction circuit according to claim 1, wherein,
    the correction value determination section outputs the phase correction value calculated by the correction value calculation section to the phase rotation section without retaining the phase correction value until the specific pattern is detected, and
    the phase rotation section subjects the input signal to a phase rotation process using the phase correction value which is output from the correction value determination section until the specific pattern is detected.

3. The phase error correction circuit according to claim 1, further comprising an alternation detection section for outputting an alternation detection signal indicating inversions of a sign of the input signal from symbol to symbol.

4. The phase error correction circuit according to claim 3, wherein the correction value calculation section calculates the phase correction value with respect to a portion of the input signal for which the alternation detection signal is output.

5. The phase error correction circuit according to claim 1, wherein
    the correction value calculation section includes:
    a phase inversion section for inverting a phase of the input signal from symbol to symbol;
    a mean value calculation section for calculating a mean value of the predetermined number of symbols in an output signal from the phase inversion section; and a mean value inversion section for inverting, depending on a sign of an output signal from the mean value calculation section, the sign of the output signal.

6. The phase error correction circuit according to claim 5, wherein the mean value calculation section calculates the mean value by cumulatively adding the output signal from the phase inversion section by using one symbol adder, such that one mean value is calculated per plurality of symbol periods.

7. The phase error correction circuit according to claim 5, wherein the mean value calculation section calculates the mean value by cumulatively adding the output signal from the phase inversion section by using a plurality of symbol adders in parallel, such that one mean value is calculated per symbol period.

8. The phase error correction circuit according to claim 7, further comprising a delay section for delaying the input signal supplied to the correction value calculation section by a predetermined amount of time from the input signal supplied to the phase rotation section,
wherein the predetermined amount of time is determined so that the specific pattern is detected by the specific pattern detection section while the correction value calculation section is calculating the phase correction value with respect to the preamble contained in the input signal.

9. The phase error correction circuit according to claim 1, wherein the correction value determination section retains the phase correction value calculated by the correction value calculation section based on the predetermined number of symbols including the last symbol of the preamble.

10. The phase error correction circuit according to claim 1, wherein the correction value determination section includes:
a correction value storage section for storing a plurality of phase correction values calculated by the correction value calculation section in a chronological order;
a correction value selection section for selecting one of the phase correction values stored in the correction value storage section; and
a correction value retention section for fetching and retaining the phase correction value selected by the correction value selection section with the timing at which the specific pattern is detected, and stopping fetching the phase correction value after the timing at which the specific pattern is detected.

11. The phase error correction circuit according to claim 10, wherein the correction value selection section receives an indication of a number of correction values to go back, and from among the phase correction values stored in the correction value storage section, selects and outputs a phase correction value as designated by the number of correction values to go back.

12. The phase error correction circuit according to claim 10, further comprising an end detection section for detecting an end portion of the data contained in the input signal to output an end detection signal,
wherein the correction value retention section starts fetching the phase correction value after a predetermined amount of time since the end detection signal is output.

13. The phase error correction circuit according to claim 1, wherein the correction value determination section stops fetching the phase correction value after the timing at which the specific pattern is detected.

14. The phase error correction circuit according to claim 13, further comprising an end detection section for detecting an end portion of the data contained in the input signal to output an end detection signal,
wherein the correction value determination section starts fetching the phase correction value after a predetermined amount of time since the end detection signal is output.

15. The phase error correction circuit according to claim 1, further comprising a 45° rotation section for rotating a phase of the input signal supplied to the correction value calculation section by 45°.

16. A receiver for receiving a digitally-modulated signal, the receiver comprising:
a detector section for detecting a received signal having a frame structure containing a premable, a unique word, and data;
a clock recovery section for recovering a clock signal from an output signal from the detector section while switching zero cross reference axes based on a given control signal; and
a phase error correction circuit for correcting a phase error in an output signal from the detector section for which judging points have been determined based on the clock signal recovered by the clock recovery section, and supplying phase error information indicating a magnitude of the phase error as the control signal to the clock recovery section,
wherein the phase error correction circuit comprises:
a correction value calculation section for calculating a phase correction value based on a predetermined number of symbols contained in the premable of the output signal from the detector section;
a correction value determination section for retaining, with a timing at which a specific pattern contained in the unique word is detected, a phase correction value calculated by the correction value calculation section;
a phase rotation section for subjecting the output signal from the detector section to a phase rotation process using the phase correction value retained in the correction value determination section; and
a specific pattern detection section for detecting the specific pattern contained in an output signal from the phase rotation section, and outputting a result of the detection to the correction value determination section.

17. A receiver for receiving a digitally-modulated signal, the receiver comprising:
a detector section for detecting a received signal having a frame structure containing a preamble, a unique word, and data;
a phase error correction circuit for correcting a phase error in an output signal from the detector section using a given clock signal; and
a clock recovery section for, based on a signal which has been corrected by the phase error correction circuit, recovering a clock signal to be used for demodulating the signal, and supplying the recovered clock signal to the phase error correction circuit,
wherein the phase error correction circuit comprises:
a correction value calculation section for calculating a phase correction value based on a predetermined number of symbols contained in the preamble of the output signal from the detector section;
a correction value determination section for retaining, with a timing at which a specific pattern contained in the unique word is detected, a phase correction value calculated by the correction value calculation section;
a phase rotation section for subjecting the output signal from the detector section to a phase rotation process using the phase correction value retained in the correction value determination section; and a specific pattern detection section for detecting the specific pattern contained in an output signal from the phase rotation section, and outputting a result of the detection to the correction value determination section.

18. A signal transmission method for transmitting data in frames, the method comprising:

generating a frame-structured data by adding, in front of data to be transmitted which is split into units of a predetermined length, a preamble which alternates from symbol to symbol, and a specific pattern selected so as not to allow a predetermined length of symbol-to-symbol alternations to occur even in the presence of a symbol error; and subjecting the frame-structured data to digital modulation and transmitting the modulated frame-structured data.

* * * * *